(12) United States Patent
Krim et al.

(10) Patent No.: US 11,842,526 B2
(45) Date of Patent: Dec. 12, 2023

(54) VOLTERRA NEURAL NETWORK AND METHOD

(71) Applicant: NORTH CAROLINA STATE UNIVERSITY, Raleigh, NC (US)

(72) Inventors: Hamid Krim, Raleigh, NC (US); Siddharth Roheda, Raleigh, NC (US); Sally Ghanem, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 361 days.

(21) Appl. No.: 17/188,464

(22) Filed: Mar. 1, 2021

(65) Prior Publication Data
US 2021/0279519 A1 Sep. 9, 2021

Related U.S. Application Data

(60) Provisional application No. 63/042,259, filed on Jun. 22, 2020, provisional application No. 62/983,480, filed on Feb. 28, 2020.

(51) Int. Cl.
| | |
|---|---|
| G06K 9/00 | (2022.01) |
| G06V 10/44 | (2022.01) |
| G06T 7/215 | (2017.01) |
| G06V 20/40 | (2022.01) |
| G06F 18/214 | (2023.01) |
| G06V 10/764 | (2022.01) |
| G06V 10/82 | (2022.01) |

(52) U.S. Cl.
CPC ........ *G06V 10/454* (2022.01); *G06F 18/2148* (2023.01); *G06T 7/215* (2017.01); *G06V 10/764* (2022.01); *G06V 10/82* (2022.01); *G06V 20/40* (2022.01); *G06T 2207/10016* (2013.01); *G06T 2207/20081* (2013.01); *G06T 2207/20084* (2013.01)

(58) Field of Classification Search
CPC ...... G06V 10/454; G06V 10/82; G06V 20/40; G06V 10/764; G06T 7/215; G06T 2207/10016; G06T 2207/20081; G06T 2207/20084; G06F 18/2148
USPC ....................................................... 382/157
See application file for complete search history.

(56) References Cited

PUBLICATIONS

O Batista, Eduardo L., and Rui Seara. "A reduced-rank approach for implementing higher-order Volterra filters." EURASIP Journal on Advances in Signal Processing 2016.1 (2016): 1-8. (Year: 2016).*
Rubiolo, Mariano, Georgina Stegmayer, and D. Milone. "Compressing arrays of classifiers using Volterra-neural network: application to face recognition." Neural Computing and Applications 23.6 (2013): 1687-1701. (Year: 2013).*

(Continued)

*Primary Examiner* — Jonathan S Lee
(74) *Attorney, Agent, or Firm* — Meunier Carlin & Curfman LLC

(57) ABSTRACT

An exemplified methods and systems provides a Volterra filter network architecture that employs a cascaded implementation and a plurality of kernels, a set of which is configured to execute an $n^{th}$ order filter, wherein the plurality of kernels of the $n^{th}$ order filters are repeatedly configured in a plurality of cascading layers of interconnected kernels to form a cascading hierarchical structure that approximates a high-order filter.

22 Claims, 14 Drawing Sheets

(56) References Cited

PUBLICATIONS

Chakrabarty, Ankush, Harsh Jain, and Amitava Chatterjee. "Volterra kernel based face recognition using artificial bee colonyoptimization." Engineering Applications of Artificial Intelligence 26.3 (2013): 1107-1114. (Year: 2013).*

Abadi, M.; Barham, P.; Chen, J.; Chen, Z.; Davis, A.; Dean, J.; Devin, M.; Ghemawat, S.; Irving, G.; Isard, M.; et al. 2016. Tensorflow: A system for large-scale machine learning. In 12th fUSENIXg Symposium on Operating Systems Design and Implementation (fOSDIg 16), 265-283.

Abavisani M, and V. M. Patel, "Deep multimodal subspace clustering networks," IEEE Journal of Selected Topics in Signal Processing, vol. 12, No. 6, pp. 1601-1614, 2018.

Baccouche, M.; Mamalet, F.; Wolf, C.; Garcia, C.; and Baskurt, A. 2011. Sequential deep learning for human action recognition. In International workshop on human behavior understanding, 29-39. Springer.

Bian X. and H. Krim, "Bi-sparsity pursuit for robust subspace recovery," in 2015 IEEE International Conference on Image Processing (ICIP). IEEE, 2015, pp. 3535-3539.

Carreira, J., and Zisserman, A. 2017. Quo vadis, action recognition? a new model and the kinetics dataset. In proceedings of the IEEE Conference on Computer Vision and Pattern Recognition, 6299-6308.

Dalal, N., and Triggs, B. 2005. Histograms of oriented gradients for human detection.

Deng, J.; Dong, W.; Socher, R.; Li, L.-J.; Li, K.; and Fei-Fei, L. 2009. Imagenet: A large-scale hierarchical image database. In 2009 IEEE conference on computer vision and pattern recognition, 248-255.

Diba, A.; Sharma, V.; and Van Gool, L. 2017. Deep temporal linear encoding networks. In Proceedings of the IEEE conference on Computer Vision and Pattern Recognition, 2329-2338.

Elhamifar E.,and R. Vidal, "Sparse subspace clustering: Algorithm, theory, and applications," IEEE transactions on pattern analysis and machine intelligence, vol. 35, No. 11, pp. 2765-2781, 2013.

Farabet, C.; Couprie, C.; Najman, L.; and LeCun, Y. 2012. Learning hierarchical features for scene labeling. IEEE transactions on pattern analysis and machine intelligence 35(8):1915-1929.

Feichtenhofer, C.; Pinz, A.; and Zisserman, A. 2016. Convolutional two-stream network fusion for video action recognition. In Proceedings of the IEEE conference on computer vision and pattern recognition, 1933-1941.

Gao, Y.; Beijbom, O.; Zhang, N.; and Darrell, T. 2016. Compact bilinear pooling. In Proceedings of the IEEE conference on computer vision and pattern recognition, 317-326.

Ghanem S, A. Panahi, H. Krim and R. A. Kerekes "Information subspace-based fusion for vehicle classification." in European Signal Processing Conference (EUSIPCO), IEEE, 2018.

Ghanem S, A. Panahi, H. Krim, and R. A. Kerekes "Robust Group Subspace Recovery: A New Approach for Multi-Modality Data Fusion" in IEEE Sensors Journal 2020.

Ghanem S., H. Krim and R. A. Kerekes "Information Fusion: Scaling Subspace Driven Approaches" Information Fusion Journal. Mar. 23, 2021.

Goodfellow, I.; Pouget-Abadie, J.; Mirza, M.; Xu, B.; Warde-Farley, D.; Ozair, S.; Courville, A.; and Bengio, Y. 2014. Generative adversarial nets. In Advances in neural information processing systems, 2672-2680.

Gulrajani, I.; Ahmed, F.; Arjovsky, M.; Dumoulin, V.; and Courville, A. C. 2017. Improved training of Wasserstein gans. In Advances in neural information processing systems, 5767-5777.

Hellwich O. and C. Wiedemann, "Object extraction from high-resolution multisensor image data," in Third International Conference Fusion of Earth Data, Sophia Antipolis, vol. 115, 2000.

Hoffman, J.; Gupta, S.; and Darrell, T. 2016. Learning with side information through modality hallucination. In Proceedings of the IEEE Conference on Computer Vision and Pattern Recognition, 826-834.

Hu S., N. J. Short, B. S. Riggan, C. Gordon, K. P. Gurton, M. Thielke, P. Gurram, and A. L. Chan, "A polarimetric thermal database for face recognition research," in Proceedings of the IEEE conference on computer vision and pattern recognition workshops, 2016, pp. 187-194.

Isola, P.; Zhu, J.-Y.; Zhou, T.; and Efros, A. A. 2017. Image-to-image translation with conditional adversarial networks. In Proceedings of the IEEE conference on computer vision and pattern recognition, 1125-1134.

Ji, S.; Xu, W.; Yang, M.; and Yu, K. 2012. 3d convolutional neural networks for human action recognition. IEEE transactions on pattern analysis and machine intelligence 35(1):221-231.

Karpathy, A.; Toderici, G.; Shetty, S.; Leung, T.; Sukthankar, R.; and Fei-Fei, L. 2014. Large-scale video classification with convolutional neural networks. In Proceedings of the IEEE conference on Computer Vision and Pattern Recognition, 1725-1732.

Kay, W.; Carreira, J.; Simonyan, K.; Zhang, B.; Hillier, C.; Vijayanarasimhan, S.; Viola, F.; Green, T.; Back, T.; Natsev, P.; et al. 2017. The kinetics human action video dataset. arXiv preprint arXiv:1705.06950.

Kingma DP. and J. Ba, "Adam: A method for stochastic optimization," arXiv preprint arXiv:1412.6980, 2014.

Kong, Y., and Fu, Y. 2018. Human action recognition and prediction: A survey. arXiv preprint arXiv:1806.11230.

Korona Z. and M. M. Kokar, "Model theory based fusion framework with application to multi-sensor target recognition," in 1996 IEEE/SICE/RSJ International Conference on Multi-sensor Fusion and Integration for Intelligent Systems (Cat. No. 96TH8242). IEEE, 1996, pp. 9-16.

Krizhevsky, A.; Sutskever, I.; and Hinton, G. E. 2012. Imagenet classification with deep convolutional neural networks. In Advances in neural information processing systems, 1097-1105.

Kuehne, H.; Jhuang, H.; Garrote, E.; Poggio, T.; and Serre, T. 2011. Hmdb: a large video database for human motion recognition. In 2011 International Conference on Computer Vision, 2556-2563. IEEE.

Kumar, R.; Banerjee, A.; Vemuri, B. C.; and Pfister, H. 2011. Trainable convolution filters and their application to face recognition. IEEE transactions on pattern analysis and machine intelligence 34(7):1423-1436.

LeCun, Y.; Bottou, L.; Bengio, Y.; Haffner, P.; et al. 1998. Gradient-based learning applied to document recognition. Proceedings of the IEEE 86(11):2278-2324.

Lee K-C., J. Ho, and D. J. Kriegman, "Acquiring linear subspaces for face recognition under variable lighting," IEEE Transactions on pattern analysis and machine intelligence, vol. 27, No. 5, pp. 684-698, 2005.

Lin, T.-Y.; RoyChowdhury, A.; and Maji, S. 2015. Bilinear CNNs for fine-grained visual recognition. arXiv preprint arXiv:1504.07889.

Liu G, Z. Lin, S. Yan, J. Sun, Y. Yu, and Y. Ma, "Robust recovery of subspace structures by low-rank representation," IEEE transactions on pattern analysis and machine intelligence, vol. 35, No. 1, pp. 171-184, 2012.

Liu, J.; Luo, J.; and Shah, M. 2009. Recognizing realistic actions from videos in the wild. Citeseer.

Mahdizadehaghdam, S.; Panahi, A.; and Krim, H., Sparse Generative Adversarial Network, 2019. Sparse generative adversarial network. In Proceedings of the IEEE International Conference on Computer Vision Workshops, 0-0.

Ng AY, M. I. Jordan, and Y. Weiss, "On spectral clustering: Analysis and an algorithm," in Advances in neural information processing systems, 2002, pp. 849-856.

Ngiam, J, A. Khosla, M. Kim, J. Nam, H. Lee, and A. Ng, "Multimodal deep learning (pp. 689-696)," in International conference on machine learning (ICML), Bellevue, WA, 2011.

Niebles, J. C.; Chen, C.-W.; and Fei-Fei, L. 2010. Modeling temporal structure of decomposable motion segments for activity classification. In European conference on computer vision, 392-405. Springer.

(56) References Cited

PUBLICATIONS

Osowski, S., and Quang, T. V. 1994. Multilayer neural network structure as volterra filter. In Proceedings of IEEE International Symposium on Circuits and Systems—ISCAS'94, vol. 6, 253-256. IEEE.

Ramachandram D., and G. W. Taylor, "Deep multimodal learning: A survey on recent advances and trends," IEEE Signal Processing Magazine, vol. 34, No. 6, pp. 96-108, 2017.

Roheda S. and H. Krim, "Conquering the cnn over-parameterization dilemma: A volterra filtering approach for action recognition," in Proceedings of the AAAI Conference on Artificial Intelligence, vol. 34, No. 07, 2020, pp. 11948-11956.

Roheda, S.; Krim, H.; Luo, Z.-Q.; and Wu, T. 2018a. Decision level fusion: An event driven approach. In 2018 26th European Signal Processing Conference (EUSIPCO), 2598-2602. IEEE.

Roheda, S.; Krim, H.; Luo, Z.-Q.; and Wu, T. 2019. Event driven fusion. arXiv preprint arXiv:1904.11520.

Roheda, S.; Riggan, B. S.; Krim, H.; and Dai, L. 2018b. Cross-modality distillation: A case for conditional generative adversarial networks. In 2018 IEEE International Conference on Acoustics, Speech and Signal Processing (ICASSP), 2926-2930. IEEE.

Sermanet, P.; Eigen, D.; Zhang, X.; Mathieu, M.; Fergus, R.; and LeCun, Y. 2013. Overfeat: Integrated recognition, localization and detection using convolutional networks. arXiv preprint arXiv:1312.6229.

Simonyan, K., and Zisserman, A. 2014. Two-stream convolutional networks for action recognition in videos. In Advances in neural information processing systems, 568-576.

Sivic, J., and Zisserman, A. 2003. Video google: A text retrieval approach to object matching in videos. In null, 1470. IEEE.

Soomro, K.; Zamir, A. R.; and Shah, M. 2012. Ucf101: A dataset of 101 human actions classes from videos in the wild. arXiv preprint arXiv:1212.0402.

Soong F. K. and A. E. Rosenberg, "On the use of instantaneous and transitional spectral information in speaker recognition," IEEE Transactions on Acoustics, Speech, and Signal Processing, vol. 36, No. 6, pp. 871-879, 1988.

Stone, M. H. 1948. The generalized weierstrass approximation theorem. Mathematics Magazine 21(5):237-254.

Tran, D.; Bourdev, L.; Fergus, R.; Torresani, L.; and Paluri, M. 2015. Learning spatiotemporal features with 3d convolutional networks. In Proceedings of the IEEE international conference on computer vision, 4489-4497.

Valada A, G. L. Oliveira, T. Brox, and W. Burgard, "Deep multispectral semantic scene understanding of forested environments using multimodal fusion," in International Symposium on Experimental Robotics. Springer, 2016, pp. 465-477.

Volterra, V. 1930. Theory of functionals and of integral and integro-differential equations. Courier Corporation. p. 623.

Wang, H.; Ullah, M. M.; Klaser, A.; Laptev, I.; and Schmid, C. 2009. Evaluation of local spatio-temporal features for action recognition.

Xu, L., A. Krzyzak, and C. Y. Suen, "Methods of combining multiple classifiers and their applications to handwriting recognition," IEEE transactions on systems, man, and cybernetics, vol. 22, No. 3, pp. 418-435, 1992.

Zach, C.; Pock, T.; and Bischof, H. 2007. A duality-based approach for realtime tv-11 optical flow. In Joint pattern recognition symposium, 214-223. Springer.

Zoumpourlis, G.; Doumanoglou, A.; Vretos, N.; and Daras, P. 2017. Non-linear convolution filters for cnn-based learning. In Proceedings of the IEEE International Conference on Computer Vision, 4761-4769.

\* cited by examiner

*Multi-stream VNN Filter*

Action recognition Using VNN

Action recognition Using VNN

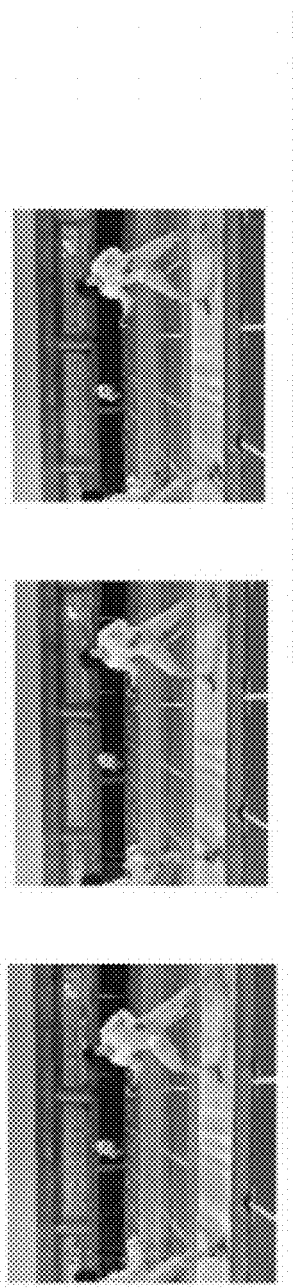
FIG. 5
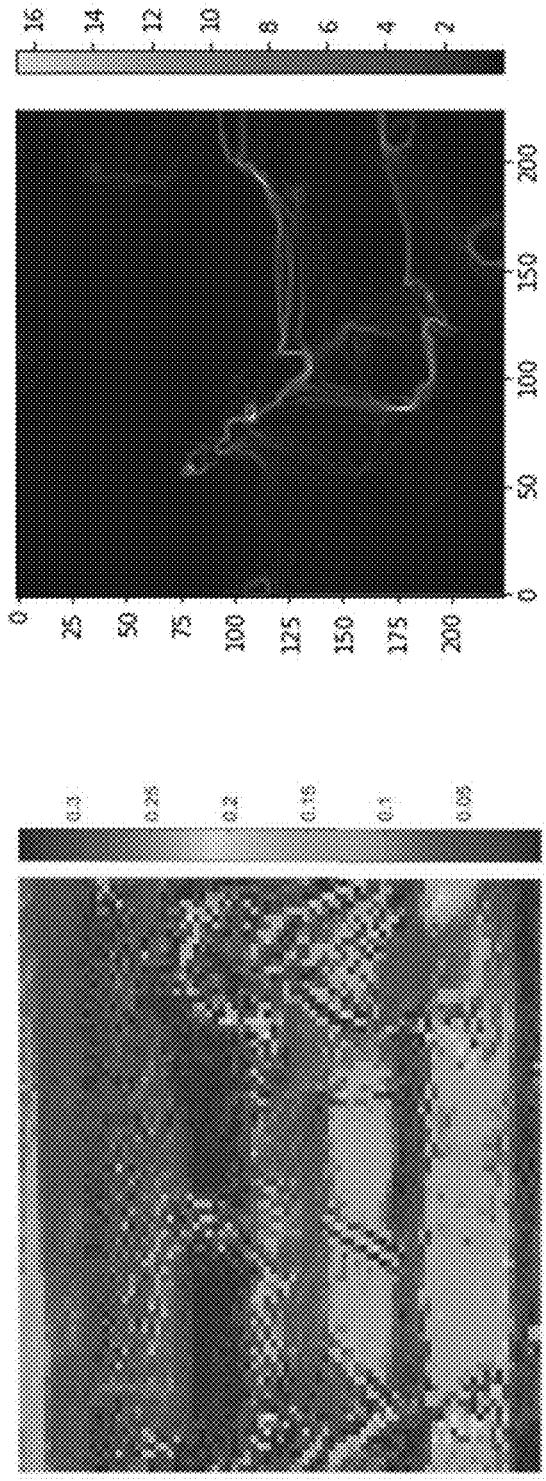
FIG. 6B
FIG. 6A

Action recognition Using VNN

Experimental Result of VNN

Experimental Result of VNN

VOLTERRA NEURAL NETWORK AND METHOD

RELATED APPLICATION

This application claims priority to, and the benefit of, U.S. Provisional Patent Application No. 62/983,480, filed Feb. 28, 2020, entitled "Volterra Neural Network (VNN): A Volterra Filtering Approach for Action Recognition," and U.S. Provisional Patent Application No. 63/042,259, filed Jun. 22, 2020, entitled "Volterra Neural Network (VNN): A Volterra Filtering Approach for Action Recognition," each of which is incorporated by reference herein in its entirety.

GOVERNMENT LICENSE RIGHTS

This invention was made with government support under grant number HQ0147-15-C-6008 awarded by the U.S. Missile Defense Agency (MDA). The government has certain rights in the invention.

BACKGROUND

The importance of inference in Machine Learning (ML) has led to an explosive number of different architectures in ML, and particularly in Deep Learning.

Convolutional Neural Network (CNN) has been widely used in deep learning for analyzing visual images in many applications. These application include but not limited to image processing, segmentation, and segmentation. However, the complexity and price of implementing CNNs can be limiting to some applications.

Nevertheless, there is a benefit for network architecture that can maintain the performance of complex ML systems while reducing their complexity.

SUMMARY

The exemplified methods and systems provide a Volterra filter network architecture (referred to herein as "Volterra Neural Network", "Volterra filter structure", "Volterra filter architecture") that employs Volterra filters that are repeatedly configured in a plurality of cascading layers of interconnected kernels to form a cascading hierarchical structure that approximates a high-order Volterra filter. The exemplary Volterra filter network architecture can significantly reduce the number of parameters required to carry out a same, or similar, classification task as that of an equivalent high-order Volterra neural network. Volterra Neural Networks (VNNs) can provide a latent representation of multi-modal data whose features are jointly captured by union of subspaces. The so-called self-representation embedding of the latent codes simplified the fusion which was driven by a similarly constructed decoding. The Volterra filter architecture beneficially leads to a reduction in the required number of parameters due to controlled non-linearities being introduced by the higher order convolutions in contrast to generalized activation functions, e.g., as used in a deep structure encoder among other like applications.

In some embodiments, a Volterra-filter based architecture is implemented where the non-linearities are introduced via the system response functions and hence by controlled interactions, e.g., between delayed frames of the video. The overall model may be updated on the basis of a cross entropy loss of the labels resulting from a linear classifier of the generated features. In some embodiments, the exemplary Volterra filter is configured for both recognition of RGB and the Optical Flow streams for action recognition which may yield a performance driven non-linear fusion of the two streams. Indeed, the number of parameters required to realize such a model may be significantly lower in comparison to a conventional CNN, which may lead to faster training and significant reduction of the required resources to learn, store, or implement such a model.

The exemplary methods and systems may provide an efficiently cascaded implementation of a Volterra Filter that can implement higher order terms operation while avoiding over-parameterization. A study was conducted to demonstrate an efficient parallel implementation of the exemplary Volterra Neural Network (VNN) which showed its remarkable performance while retaining a relatively simpler and potentially more tractable structure. Furthermore, the study showed an adaptation of the network to non-linearly fuse the RGB (spatial) information (of an inputted image) and the Optical Flow (temporal) information of a video sequence for action recognition. The exemplary Volterra Neural Network (also referred to herein as "VNN") was evaluated on UCF-101 and HMDB-51 datasets for action recognition and has been shown to outperform state of the art CNN approaches.

In an aspect, a computer-implemented neural network (e.g., CPU(s) or GPU(s)) is disclosed comprising a processor and a memory configured to execute a memory structure comprising nodes connected via a plurality of layers, the memory structure comprising: a plurality of kernels, a set (e.g., substantial portion) of which being configured to execute an $n^{th}$ order filter (e.g., $2^{nd}$ or $3^{rd}$-order filter), wherein the plurality of kernels of the $n^{th}$ order filters are repeatedly configured in a plurality of cascading layers of interconnected kernels to form a cascading hierarchical structure that approximates a high-order filter substantially greater than n (e.g., wherein a $K^{th}$ order filter is realized by applying the $2^{nd}$ order filter a pre-defined number of times (e.g., $K=2^{2^{(Z-1)}}$)).

In some embodiments, the $n^{th}$ order filters each comprise a $2^{nd}$ or $3^{rd}$-order filter to form the cascading hierarchical structure and approximates a $4^{th}$ order filter or more.

In some embodiments, the $n^{th}$ order filters each includes a Volterra filter that models an input-output relationship of a nonlinear system.

In some embodiments, the Volterra filter is implemented as a product operator of two 3-dimensional matrices.

In some embodiments, the cascading hierarchical structure approximates a $K^{th}$ order filter from Z number of $2^{nd}$ order filters according to $K=2^{2^{(Z-1)}}$.

In some embodiments, the plurality of cascading layers include at least a first cascade layer and a second cascade layer, wherein the output features of the first cascade layer are overlapped to provide non-linearly cascading inputs into the second cascade layer (e.g., to provide controlled non-linearities in the form of interactions between delayed input samples of data).

In some embodiments, the output features of the first cascade layer are overlapped to provide quadratic interactions between the first cascading layer and the second cascading layer.

In some embodiments, the set of the plurality of kernels each comprises a Volterra filter having an $n^{th}$ order filter and a filter length of at least 2.

In some embodiments, each cascading layer (i.e., the plurality of Volterra in a given layer) of the plurality of cascading layers has a same configuration (e.g., same Kth order and layer length).

In some embodiments, each kernel (e.g., Volterra filter) of a first cascade layer has a first configuration and each kernel of a second cascade layer has a second configuration, wherein the first configuration is different from the second configuration.

In some embodiments, the computer-implemented neural network is configured to output a plurality of predictor values each associated with a likelihood of a given recognized action being present or not present from among a set of evaluate-able recognized actions.

In some embodiments, the plurality of kernels of the cascading hierarchical structure are used to independently assess a first data set for first modality features (e.g., spatial features), wherein the memory structure further comprises a second plurality of kernels, a set of which being configured to execute an $m^{th}$ (e.g., $2^{nd}$ or $3^{rd}$-order filter), wherein the second plurality of kernels of the $m^{th}$ order filters are repeatedly configured in a plurality of cascading layer of interconnected kernels to form a second cascading hierarchical structure that approximates a high-order filter substantially greater than m, wherein the second plurality of kernels of the second cascading hierarchical structure are used to independently assess a second data set for second modality features (e.g., temporal features), a fusion operator configured to fuse i) the first modality features of the first plurality of kernels in the first cascading hierarchical structure and ii) the second modality features of the second plurality of kernels in the second cascading hierarchical structure to generate output predictors (e.g., for action recognition).

In some embodiments, the fusion operator comprises a Volterra filter (e.g., $2^{nd}$-order Volterra filter or higher).

In some embodiments, the first and second modality features comprise spatial features and temporal features, respectively, wherein the computer-implemented neural network further comprises a classifier to output indication of presence or non-presence of a recognized action in a set of video frames or an image sequence having representations of one or more action therein based on the spatial features and temporal features.

In some embodiments, the first data set comprise a set of video frames.

In some embodiments, the set of video frames comprises red, green, and blue (RGB) data values.

In some embodiments, the second modality features are associated with an optical flow analysis.

In some embodiments, the fusion operator evaluate nonlinear interactions between the first modality features and the second modality features.

In another aspect, a method is disclosed of training, via a computing system, a computer-implemented neural network to generate a trained neural network as described above, wherein the training configures weights of the computer-implemented neural network; and using the trained neural network in an action recognition application.

In some embodiments, the action recognition application is used for surveillance application, a video retrieval application, or a man-machine interaction application.

A non-transitory computer readable medium having instructions stored therein, wherein execution of the instructions, by a processor (e.g., CPUs or GPUs), cause the processor to configure a neural network according to the above.

In some embodiments, the non-transitory computer readable medium includes instructions for the training of the neural work, wherein the training configures weights of the neural network.

BRIEF DESCRIPTION OF DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIG. 5 shows example images used in a study to evaluate the exemplary VNN.

FIGS. 6A, 6B, and 6C each shows example feature sets extracted from the images of FIG. 5 using the exemplary VNN in an example application (for action recognition) in accordance with an illustrative embodiment.

DETAILED DESCRIPTION

Each and every feature described herein, and each and every combination of two or more of such features, is included within the scope of the present invention provided that the features included in such a combination are not mutually inconsistent.

Example Volterra Filter Based Classification

Figure 1:
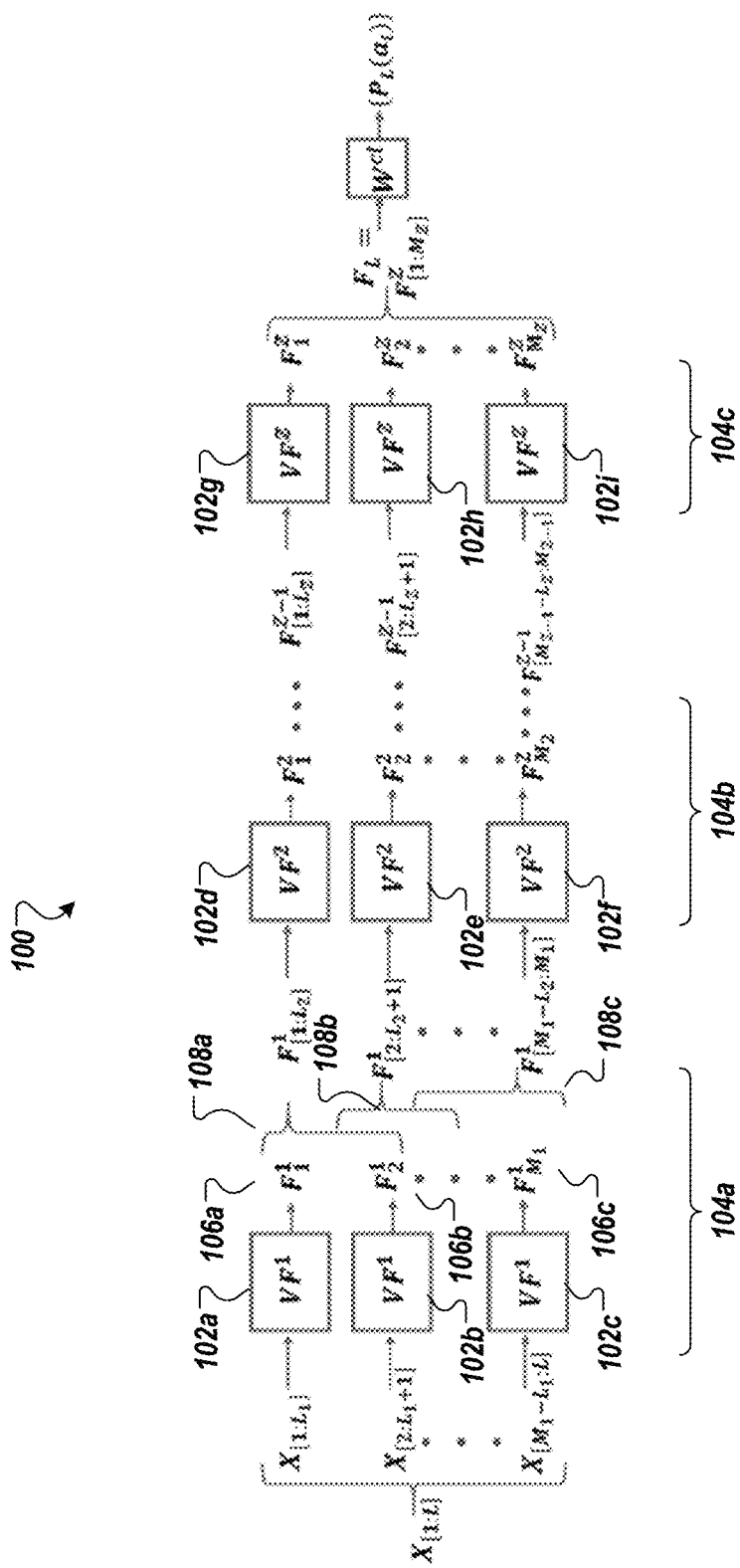
FIG. 1 is a block diagram of an example Volterra neural network in accordance with an illustrative embodiment.

FIG. 1 is a block diagram 100 of an example Volterra neural network ("VNN", also referred to herein as "cascade Volterra neural network" as well as an "overlapping Volterra neural network" ("O-VNN")) in accordance with an illustrative embodiment.

The VNN 100 is a computer-implemented neural network (e.g., can be in a CPU(s) or GPU(s) system) that is implemented in a system comprising a processor and a memory configured to execute a memory structure. As used herein, processor can refer to digital logic circuitries (e.g., embodied in VHDL designs such as CPDs, FPGAs, GPUs, and the like) or microprocessors (e.g., individual microprocessors, microprocessor cores, microcontrollers, mixed-circuits, etc.), or a combination thereof. Memory can refer to any storage element, e.g., computer memory as well as latches, queues, and any digital logic that can storage information. In the VNN 100, the memory structure includes a plurality of kernels 102 (shown as Volterra filter VP 102a-102i in which n defines the cascade layer number) as nodes in which a set is configured to execute an $n^{th}$ (e.g., $2^{nd}$ or $3^{rd}$-order filter) order filter (e.g., Volterra filter) later described herein. The kernels 102 are repeatedly configured in a plurality of cascading layers 104 (shown as 104a, 104b) of interconnected kernels to form a cascading hierarchical structure that approximates a high-order filter substantially greater than n (e.g., wherein a $K^{th}$ order filter is realized by applying the $2^{nd}$ order filter a pre-defined number of times (e.g., $K=2^{2^{(Z-1)}}$)).

In FIG. 1, the plurality of cascading layers (shown as 104a, 104b in this figure) have output features 106 (shown as "$F_1^1$" 106a, "$F_2^1$" 106b, "$F_{M1}^1$" 106c, "$F_1^2$" 106d, "$F_2^2$" 106e, "$F_{M2}^2$" 106f) that are union or joined (shown as overlapping interconnections 108a, 108b, 108c) to provide non-linearly cascading inputs (as well as linear) into later cascading layers (e.g., to beneficially provide controlled non-linearities, and linearities, in the form of interactions between delayed input samples of data). As shown, the union (embodied as connection 108a) between kernels 102a and 102b joins their outputs 106a, 106b to generate a joined feature output "$F_{[1:L2]}^1$" 108a (also can be referred to as "combined feature output"), the union (embodied as connection 108b) between kernels 102a and nearby, subsequent kernel(s) (not shown) joins their outputs to generate a joined feature output "$F_{[2:L2+1]}^1$" 108b, and union (as embodied in connection 108c) between kernels 102a and 102c combines all their feature outputs to generate a combined or joined feature output "$F_{[M1-L2:M1]}^1$" 108c. In FIG. 1, this overlapping interconnections is present between any number of cascading layers. The last layer 104c aggregates all the output features (shown as $F_1^Z$, $F_2^Z$, $F_{M_Z}^Z$) of kernels 102g, 102h, 102i to provide a feature output "$F_{[1:M_Z]}^Z$" 110 for the VNN 100. The various combinations of the interconnections may be used to provide any number of structure for the subsequent cascading layer.

The Volterra filter structure 100 may be considered to facilitate the approximation of a function g(:). The Volterra neural network 100 may be configured for video data (as well as image data, scientific data, control data, among others), which is used to demonstrate an example here, though the utility and framework may be applied more broadly to any class of data, including time series data sets. The Volterra neural network 100 may include an adaptive Volterra filter and/or nested Volterra filter (as kernels 102) to extract features, e.g., for image-based and/or action-based classification, or for controls, etc. The exemplary Volterra filter structure has wide applicability, for example, for autoencoder in fusion selection application as later described herein. In some embodiments, the exemplary Volterra Neural Network may be implemented in, or embodied as, an autoencoder, a variational autoencoder, a generative adversarial network, a classifier or regression model, a convolutional neural network, a probabilistic neural network, a time delay neural network, a deep neural network, a deep convolutional network, a deconvolutional network, a feedforward neural network, a recurrent neural network, a long-short term memory network, a Kohonen network, a Support Vector Machine, and a Markov chain-based network.

In some embodiments, the extracted features of the VNN 100 can be defined per Equation 1.

$$F\begin{bmatrix}t\\s_1\\s_2\end{bmatrix} = g\left(X\begin{bmatrix}t-L+1:t\\s_1-p_1:s_1+p_1\\s_2-p_2:s_2+p_2\end{bmatrix}\right) = \sum_{\tau_1,\sigma_{11},\sigma_{21}} W_{\tau_1,\sigma_{11},\sigma_{21}}^1 \begin{bmatrix}\tau_1\\\sigma_{11}\\\sigma_{21}\end{bmatrix} X\begin{bmatrix}t-\tau_1\\s_1-\sigma_{11}\\s_2-\sigma_{21}\end{bmatrix} +$$
$$\sum_{\substack{\tau_1,\sigma_{11},\sigma_{21}\\\tau_2,\sigma_{12},\sigma_{22}}} W^2 \begin{bmatrix}\tau_1\\\sigma_{11}\\\sigma_{21}\end{bmatrix}\begin{bmatrix}\tau_2\\\sigma_{12}\\\sigma_{22}\end{bmatrix} X\begin{bmatrix}t-\tau_1\\s_1-\sigma_{11}\\s_2-\sigma_{21}\end{bmatrix} X\begin{bmatrix}t-\tau_2\\s_1-\sigma_{12}\\s_2-\sigma_{22}\end{bmatrix} + \cdots$$

(Equation 1)

In Equation 1, $\tau_j \in [0, L-1]$, $\sigma_{1j} \in [-p_1, p_1]$, and $\sigma_{2j} \in [-p_2, p_2]$. Per the formulation of Equation 1 and later discussed herein, the exemplary VNN 100 may include a linear classifier to determine a probability of each action in $\mathcal{A}$.

The exemplary VNN 100 is configured to update the filter parameters by minimizing aspects of measure of discrepancy relative to the ground truth. The exemplary VNN 100 may determine a probability by a model. In some embodiments, the adopted measure comprises a cross-entropy loss, e.g., as computed per Equation 2.

$$E = \sum_{t,i} -d_{t_i} \log P_t(a_i) \quad \text{(Equation 2)}$$

In Equation 2, $\tau_j \in \{1, L+1, 2L+1, \ldots, T\}$, $i \in \{1, 2, \ldots, I\}$, $d_{t_i}$ is the ground truth label for $X_{[t-L+1:t]}$ belonging to an $i^{th}$ action class. The exemplary VNN 100 can thus minimize the error.

In some embodiments, the exemplary VNN 100 is configured to include a weight decay to ensure generalizability of the model by penalizing large weights. To this end, the overall cost functional which may serve as a target metric may be written per Equation 3.

$$\min_g \sum_{t,I} -d_{t_i} \log \rho\left(w_i^{clT} \cdot g(X_{[t-L+1:t]}) + b_i^{cl}\right) + \frac{\lambda}{2}\left[\sum_{k=1}^{K} \|W^k\|_2^2 + \|W^{cl}\|_2^2\right],$$

(Equation 3)

In Equation 3, ρ is a soft-max function, and K is an order of the filter. It is later shown herein that the exemplary VNN architecture (e.g., 100) can approximate any continuous function including action functions like sigmoid/ReLU with an error margin defined by the Taylor Remainder Theorem (see "Proposition #1" below). In addition, it is shown that the nonlinearity introduced by the Volterra architecture allows for a more optimal solution as compared with a standard activation function (see "Proposition #2" below).

Non-Linearity Enhancement: Cascaded Volterra Filters. In some embodiments, the exemplary VNN 100 may be configured with a cascade of $2^{nd}$ order Volterra filters, or other low-$n^{th}$ order Volterra filters, in which the second order filter, or $n^{th}$ order filter, is repeatedly applied until a desired order K is attained. A $K^{th}$ order filter may be realized, for example, by applying the $2^{nd}$ order filter $Z$ times, where $K=2^{2(\mathcal{R}-1)}$. Indeed, if the length of the first filter in the cascade is $L_1$, the exemplary VNN may view the input video $X_{[t-L+1:t]}$ as a concatenation of a set of shorter videos per Equation 4.

$$X_{[t_L:t]} = [X_{[t_L:t_L+L_1]} X_{[t_L+L_1:t_L+2L_1]} \cdots X_{[t_L+(M_1-1)L_1:t_L+M_1L_1]}], \quad \text{(Equation 4)}$$

Per Equation, $$M_1 = \frac{L}{L_1},$$

and $t_L = t - L + 1$. To this end, a 2nd order filter $g_1(:)$ when applied on each of the sub-videos leads to the features as defined in Equation 5.

$$F^1_{t_{[1:M_1]}} = [g_1(X_{[t_L:t_L+L_1]}) \quad \text{(Equation 5)}$$
$$g_1(X_{[t_L+L_1:t_L+2L_1]}) \cdots g_1(X_{[t_L+(M_1-1)L_1:t_L+M_1L_1]})].$$

A second filter $g_2(\cdot)$ of length $L_2$ may then be applied to the output of the first filter as shown in Equation 6.

$$F^2_{t_{[1:M_2]}} = [g_2(F^1_{t_{[1:L_2]}}) \quad \text{(Equation 6)}$$
$$g_2(F^1_{t_{[L_2+1:2L_2]}}) \cdots g_2(F^1_{t_{[(M_2-1)L_2+1:(M_2L_2)]}})],$$

In Equation 6, $$M_2 = \frac{M_1}{L_2}.$$

In some embodiments, the features in the second layer of the exemplary VNN are generated by taking quadratic interactions between those generated by the first layer, hence, leading to 4th order terms.

To this end, for a cascade of $Z$ filters, the final set of features may be obtained per Equation 7.

$$F^Z_{t_{[1:M_Z]}} = [g_Z(F^{Z-1}_{t_{[1:L_Z]}}) \, g_Z \quad \text{(Equation 7)}$$
$$(F^{Z-1}_{t_{[L_Z+1:2L_Z]}}) \cdots g_Z(F^{Z-1}_{t_{[(M_Z-1)L_Z+1:(M_ZL_Z)]}})],$$

In Equation 7, $$M_z = \frac{M_{z-1}}{L_z}.$$

In some embodiments, these filters may also be implemented in an overlapping fashion leading to the following features for the $z^{th}$ layer, $z \in \{1, \ldots, Z\}$ as:

$$F^z_{t_{[1:M_z]}} = [g_z(F^{z-1}_{t_{[1:L_z]}}) \, g_z(F^{z-1}_{t_{[2:L_z+1]}}) \cdots g_z(F^{z-1}_{t_{[(M_z-1)-L_z+1:M_z-1]}})],$$

where $M_z \in M_{z-1} - L_z + 1$. Indeed, FIG. 1 shows an example implementation of a Volterra neural network, which may be used to find corresponding feature maps for an input video.

The cascade of $2^{nd}$ order Volterra filters (e.g., 102), or other low order filter, as shown in FIG. 1 beneficially alleviates the increased complexity of the Volterra architecture which often increases exponentially when the order is increased.

The number of required parameters for a conventional $K^{th}$ order filter is $$\sum_{k=1}^{K} (L \cdot [2p_1 + 1] \cdot [2p_2 + 1])^k.$$

This complexity can increase exponentially when the order is increased, thus making a higher order (>3) more costly.

It can be shown that a Volterra Network with a $2^{nd}$ order Volterra filter has an effective order of $K_Z = 2^{2^{Z-1}}$ (see Proposition #4). It can also be shown that the complexity of a $K^{th}$ order cascaded filter can be defined as Equation 8.

$$\sum_{z=1}^{Z} [(L_2 \cdot [2p_{1_z} + 1] \cdot [2p_{2_z} + 1]) + (L_z \cdot [2p_{1_z} + 1] \cdot [2p_{2_z} + 1])^2] \quad \text{(Equation 8)}$$

If a multi-channel input/output is considered, the number of parameters is:

$$\sum_{z=1}^{Z} (n_{ch}^{z-1} \cdot n_{ch}^z)[(L_z[2p_{1_z} + 1] \cdot [2p_{2_z} + 1]) + (L_z \cdot [2p_{1_x} + 1] \cdot [2p_{2_x} + 1])^2],$$

where $n_{ch}^z$ is the number of channels in the output of the $z^{th}$ layer.

The exemplary VNN may be input bounded to improve stability. In some embodiments, the exemplary VNN is configured to be Bounded Input Bounded Output (BIBO) stable. It can be shown that an O-VNN described herein with $Z$ layers is BIBO stable if $\forall_z \in \{1, \ldots, Z\}$, $$\sum_{\tau_1, \sigma_{11}, \sigma_{21}} \left| W^{z1}_{\tau_1} \begin{bmatrix} \tau_1 \\ \sigma_{11} \\ \sigma_{21} \end{bmatrix} \right| + \sum_{\tau_1, \sigma_{11}, \sigma_{21}} \left| W^{z2}_{\tau_1} \begin{bmatrix} \tau_1 \\ \sigma_{11} \\ \sigma_{21} \end{bmatrix} \begin{bmatrix} \tau_2 \\ \sigma_{12} \\ \sigma_{22} \end{bmatrix} \right| < \infty$$

(see Propositions #5 and #6).

The sufficient condition for the system to be BIBO stable is provided in Equation 9.

$$\sum_{\tau_1, \sigma_{11}, \sigma_{21}} \left| W^{z1}_{\tau_1} \begin{bmatrix} \tau_1 \\ \sigma_{11} \\ \sigma_{21} \end{bmatrix} \right| + \sum_{\tau_1, \sigma_{11}, \sigma_{21}} \left| W^{z2}_{\tau_1} \begin{bmatrix} \tau_1 \\ \sigma_{11} \\ \sigma_{21} \end{bmatrix} \begin{bmatrix} \tau_2 \\ \sigma_{12} \\ \sigma_{22} \end{bmatrix} \right| < \infty \quad \text{(Equation 9)}$$

Per Equation 9, if the input data (i.e., video frames) is bounded, then the output of each layer as provided that Equation 24 is satisfied $\forall \in \{1, \ldots, Z\}$ making the entire system BIBO stable.

Synthesis and Implementation of Volterra Kernels. In some embodiments, Volterra kernels of the exemplary VNN 100 may be implemented using a 3D convolution function, e.g., in Tensorflow similar, or same, to that described in Abadi et al., "Tensorflow: A system for large-scale machine learning," Symposium on Operating Systems Design and Implementation, 265-283, which is incorporated by reference herein. The linear kernel ($1^{st}$ order) of the Volterra filter may be similar to a convolutional layer in a conventional CNNs.

In some embodiments, the second order kernel may be approximated as a product of two 3-dimensional matrices (e.g., a separable operator) as shown in Equation 10.

$$W^2_{L \times P_1 \times P_2 \times L \times P_1 \times P_2} = \sum_{q=1}^{Q} W^2_{a_{q_{L \times P_1 \times P_2 \times 1}}} W^2_{b_{q_{1 \times L \times P_1 \times P_2}}} \quad \text{(Equation 10)}$$

In Equation 10, $P_1=2p_1+1$, and $P_2=2p_2+1$. In Equation 11 may be expressed as Equations 12 considering Equation 1.

$$g\left(X\begin{bmatrix} t-L+1:t \\ s_1-p_1:s_1+p_1 \\ s_2-p_2:s_2+p_2 \end{bmatrix}\right) = \sum_{\tau_1,\sigma_{11},\sigma_{21}} W^1\begin{bmatrix} \tau_1 \\ \sigma_{11} \\ \sigma_{21} \end{bmatrix} x\begin{bmatrix} t-\tau_1 \\ s_1-\sigma_{11} \\ s_2-\sigma_{21} \end{bmatrix} + \quad \text{(Equation 11)}$$

$$\sum_{\substack{\tau_1,\sigma_{11},\sigma_{21} \\ \tau_2,\sigma_{12},\sigma_{22}}} \sum_{q=1}^{Q} W^2_{a_q\begin{bmatrix} \tau_1 \\ \sigma_{11} \\ \sigma_{22} \end{bmatrix}} W^2_{b_q\begin{bmatrix} \tau_2 \\ \sigma_{12} \\ \sigma_{22} \end{bmatrix}} x\begin{bmatrix} t-\tau_1 \\ s_1-\sigma_{11} \\ s_2-\sigma_{21} \end{bmatrix} x\begin{bmatrix} t-\tau_2 \\ s_1-\sigma_{12} \\ s_2-\sigma_{22} \end{bmatrix}$$

Equation 11 can be re-expressed as Equation 12.

$$= \sum_{\tau_1,\sigma_{11},\sigma_{21}} W^1\begin{bmatrix} \tau_1 \\ \sigma_{11} \\ \sigma_{21} \end{bmatrix} x\begin{bmatrix} t-\tau_1 \\ s_1-\sigma_{11} \\ s_2-\sigma_{21} \end{bmatrix} + \quad \text{(Equation 12)}$$

$$\sum_{q=1}^{Q} \sum_{\substack{\tau_1,\sigma_{11},\sigma_{21} \\ \tau_2,\sigma_{12},\sigma_{22}}} \left(W^2_{a_q\begin{bmatrix} \tau_1 \\ \sigma_{11} \\ \sigma_{22} \end{bmatrix}} x\begin{bmatrix} t-\tau_1 \\ s_1-\sigma_{11} \\ s_2-\sigma_{21} \end{bmatrix}\right)\left(W^2_{b_q\begin{bmatrix} \tau_2 \\ \sigma_{12} \\ \sigma_{22} \end{bmatrix}} x\begin{bmatrix} t-\tau_2 \\ s_1-\sigma_{12} \\ s_2-\sigma_{22} \end{bmatrix}\right)$$

As shown in Equation 12, a larger Q may provide a better approximation of the $2^{nd}$ order kernel. An advantage of this class of approximation may be at least two-fold. Firstly, the number of parameters may be further reduced, e.g., if for the $z^{th}$ layer, $$\left(L_z \cdot [2p_{1_z}+1] \cdot [2p_{2_z}+1]\right)^2 > 2Q\left(L_z \cdot [2p_{1_z}+1] \cdot [2p_{2_z}+1]\right).$$

In some embodiments, the trade-off between performance and available computational resources may be accounted for when performing such an approximation. Additionally, the exemplary VNN may implement a higher order kernels, e.g., per Tensorflow (Abadi et al. 2016) by using a built-in convolutional operator.

Two-Stream Volterra Networks. In some embodiments, the cascaded Volterra filter (e.g., of FIG. 3) may have approximate quadratic layers which may have a number of parameters as defined per Equation 13.

$$\sum_{z=1}^{Z} [(L_z \cdot [2p_{1_z}+1] \cdot [2p_{2_z}+1]) + \quad \text{(Equation 13)}$$

$$2Q(L_z \cdot [2p_{1_z}+1] \cdot [2p_{2_z}+1])]$$

It can be shown that the approximation discussed in Equation 10 is a $Q^{th}$ rank approximation of the exact quadratic kernel, $W^2$ (see Proposition #7).

Multi-Stream Volterra Networks. In some embodiments, the cascaded Volterra-Filter classifier comprises a multi-modality VNN filter or fusion operator. In an example, spatio-temporal Volterra filter may be used for action recognition operation in video. That is, VNN filter may use to combine both spatial and the temporal information from two information streams.

In some embodiments, independent cascaded Volterra filters are first used to extract features from each modality as shown in Equations 14 and 15.

$$F^{Z^{RGB}}_{[1:M_Z]} = g^{RGB}_Z(\quad . \quad . \quad . \quad g_2^{RGB}(g_1^{RGB} (X_{[t-L+1:t]}^{RGB}))) \quad \text{(Equation 14)}$$

$$F^{Z^{OF}}_{[1:M_Z]} = g^{OF}_Z(\ldots g_2^{OF}(g_1^{OF}(X_{[t-L+1:t]}^{OF}))) \quad \text{(Equation 15)}$$

In some embodiments, an additional Volterra filter is solely used for combining the generated feature maps from both modalities as shown in Equation 16.

$$F_t^{(RGB+OF)} = \sum_{\tau_1,\sigma_{11},\sigma_{21},u_1} W^1\begin{bmatrix} \tau_1 \\ \sigma_{11} \\ \sigma_{21} \\ u_1 \end{bmatrix} f^{Z^{u_1}}\begin{bmatrix} t-\tau_1 \\ s_1-\sigma_{11} \\ s_2-\sigma_{21} \end{bmatrix} + \quad \text{(Equation 16)}$$

$$\sum_{\substack{\tau_1,\sigma_{11},\sigma_{21},u_1 \\ \tau_2,\sigma_{12},\sigma_{22},u_2}} W^1\begin{bmatrix} \tau_1 \\ \sigma_{11} \\ \sigma_{21} \\ u_1 \end{bmatrix}\begin{bmatrix} \tau_2 \\ \sigma_{12} \\ \sigma_{22} \end{bmatrix} f^{Z^{u_1}}_{M_Z-\tau_1}\begin{bmatrix} t-\tau_1 \\ s_1-\sigma_{11} \\ s_2-\sigma_{21} \end{bmatrix} f^{Z^{u_2}}_{M_Z-\tau_2}\begin{bmatrix} t-\tau_2 \\ s_1-\sigma_{12} \\ s_2-\sigma_{22} \end{bmatrix}$$

Figure 2A:
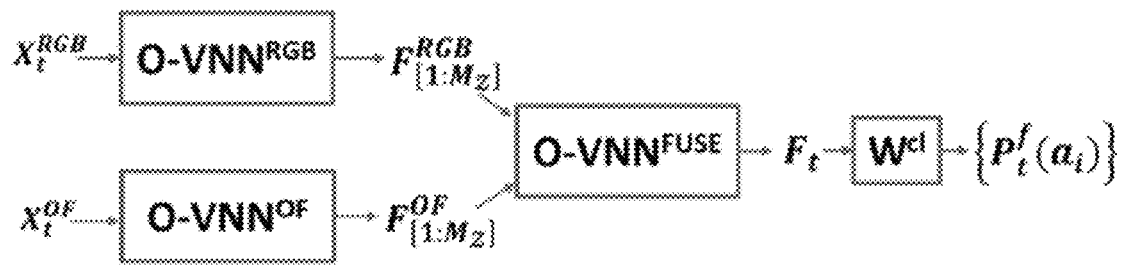
FIGS. 2A, 2B, and 2C show various implementations of a multi-stream cascaded Volterra network in accordance with an illustrative embodiment.

In Equation 16, $\tau_j \in [0, L Z_{+1}]$, $\sigma_{1j} \in [-p_1, p_1]$, $\sigma_{2j} \in [-p_2, p_2]$, and $u_j \in [RGB, OF]$. FIG. 2A shows a block diagram of a two-stream Volterra filter configured to fuse the two information streams.

Further description and example applications are provided in Roheda et al., "Conquering the CNN Over-Parameterization Dilemma: A Volterra Filtering Approach for Action Recognition" [2'] and Roheda et al., "Volterra Neural Networks (VNNS): A Volterra Filtering Approach for Human Action Recognition, Target Detection, and Multi-Model Fusion" (Appendix of U.S. Provisional Patent Application No. 63/042,259), which is incorporated by reference herein in its entirety.

Experimental Results and Examples VNNs for Action Recognition

A study was conducted to evaluate the performance of the exemplary VNN on action recognition datasets, including a UCF-101 data set (Soomro, Zamir, and Shah 2012) and a HMDB-51 data set (Kuehne et al. 2011). The instant study compared the results of the exemplary VNN with results of recent state of the art implementations.

Figure 2B:
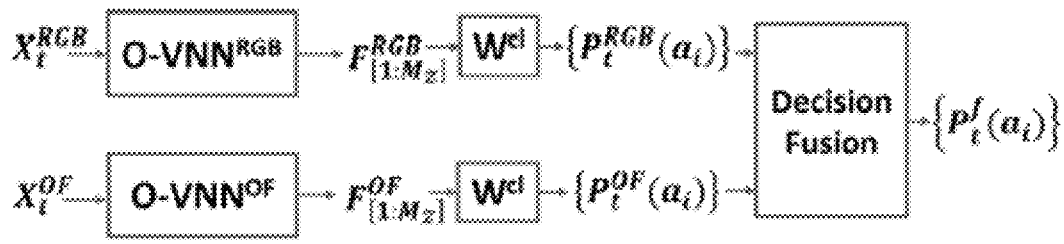
Figure 2C:
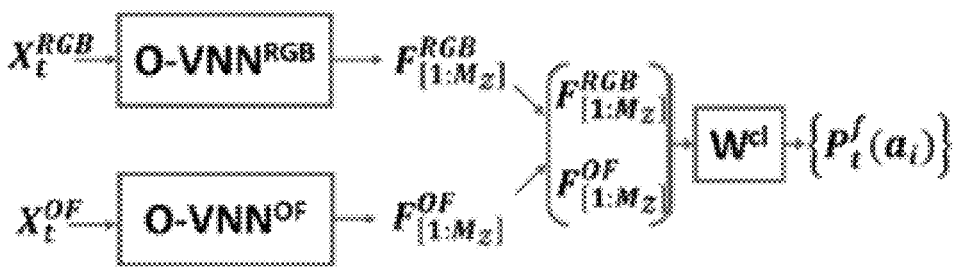

FIGS. 2A, 2B, and 2C show various implementation of a cascaded Volterra filter in accordance with an illustrative embodiment. In FIG. 2A, a two stream Volterra filter is shown. In FIG. 2B, a Volterra filter configured for decision fusion is shown. In FIG. 2C, a Volterra filter configured for feature concatenation is shown.

In FIG. 2A, to fuse the two information streams, decision level fusion and feature level fusion was performed.

In Decision level fusion, the decision probabilities $P^{RGB}_t(a_i)$ and $P^{OF}_t(a_i)$ are independently computed and are combined to determine the fused probability $P^f_t=(a_i)$ using weighted averaging and event driven fusion.

Weight averaging: $P^f_t(a_i)=\beta^{RGB}P^{RGB}_t(a_i)+\beta^{OF}P^{OF}_t(a_i)$, where $\beta^{RGB}+\beta^{OF}=1$, which control the importance/contribution of the RGB and Optical Flow streams towards making a final decision.

Event Driven Fusion (Roheda et al. 2018a, 2019): $P^f_t(a_i)=\gamma P_t^{MAX\,MI}(a_i^{RGB}, a_i^{OF})+(1-\gamma)P_t^{MIN\,MI}(a_i^{RGB}, a_e^e)$, where $\gamma$ is a pseudo measure of correlation between the two information streams, $e_t^{MAX\,MI}(\bullet)$ is the joint distribution with maximal mutual information, and $P_t^{MIN\,MI}(\bullet)$ is the joint distribution with minimal mutual information.

In the feature level fusion, features are extracted from each stream independently, and are subsequently merged before making a decision. For this level of fusion, a simple feature concatenation may be used as shown in FIG. 2B.

Table 1 shows experiment results showing comparison of the exemplary VNN as compared to other convolutional neural network (CNN) system. In Table 1, the VNN and CNN performs analysis of only the RGB stream.

TABLE 1

| Method | Pre-Training | Avg Accuracy UCF-101 | Avg Accuracy HMDB-51 |
|---|---|---|---|
| Slow Fusion (Karpathy et al. 2014) | Y (Sports-1M) | 64.1% | — |
| Deep Temporal Linear Encoding Networks (Diba, Sharma, and Van Gool 2017) | Y (Sports-1M) | 86.3% | 60.3% |
| Inflated 3D CNN (Carreira and Zisserman 2017) | Y (ImageNet + Kinetics) | 95.1% | 74.3% |
| Soomro et al. 2012 | N | 43.9% | — |
| Single Frame CNN (Karpathy et al. 2014; Krizhevsky, Sutskever, and Hinton 2012) | N | 36.9% | — |
| Slow Fusion (Karpathy et al.; Baccouche et al.; Ji et al.) | N | 41.3% | — |
| 3D-ConvNet (Carreira and Zisserman 2017; Tran et al. 2015) | N | 51.6% | 24.3% |
| Volterra Filter | N | 38.19% | 18.76% |
| O-VNN (exact) | N | 58.73% | 29.33% |
| O-VNN (Q = 7) | N | 53.77% | 25.76% |

Table 2 shows experiment results showing comparison of the exemplary VNN as compared to other convolutional neural network (CNN) system. In table 2, the VNN and CNN performs analysis of both the RGB and an action stream.

TABLE 2

| Method | Pre-Training | Avg Accuracy UCF-101 | Avg Accuracy HMDB-51 |
|---|---|---|---|
| Two-Stream CNNs (Simonyan and Zisserman 2014) | Y (ILSVRC-2012) | 88.0% | 72.7% |

TABLE 2-continued

| Method | Pre-Training | Avg Accuracy UCF-101 | Avg Accuracy HMDB-51 |
|---|---|---|---|
| Deep Temporal Linear Encoding Networks (Diba, Sharma, and Van Gool 2017) | Y (BN-Inception + ImageNet) | 95.6% | 71.1% |
| Two Stream Inflated 3D CNN (Carreira and Zisserman 2017) | Y (ImageNet + Kinetics) | 98.0% | 80.9% |
| Two-Stream O-VNN (Q = 15) | Y (Kinetics) | 98.49% | 82.63% |
| Two Stream Inflated 3D CNN (Carreira and Zisserman 2017) | N | 88.8% | 62.2% |
| Weighted Averaging: O-VNN (exact) | N | 85.79% | 59.13% |
| Weighted Averaging: O-VNN (Q = 7) | N | 81.53% | 55.67% |
| Event Driven Fusion: O-VNN (exact) | N | 85.21% | 60.36% |
| Event Driven Fusion: O-VNN (Q = 7) | N | 80.37% | 57.89% |
| Feature Concatenation: O-VNN (exact) | N | 82.31% | 55.88% |
| Feature Concatenation: O-VNN (Q = 7) | N | 78.79% | 51.08% |
| Two-Stream O-VNN (exact) | N | 90.28% | 65.61% |
| Two-Stream O-VNN (Q = 7) | N | 86.16% | 62.45% |

As shown in Tables 1 and 2, the exemplary VNN had comparable performance to the state of the art while doing so with a significantly lower number of parameters (see Table 3).

Furthermore, the study observed a significant boost in performance by allowing non-linear interaction between the two information streams in which one of the information stream is an Optical Flow analysis was computed using the TV-L1 algorithm (Zach, Pock, and Bischof 2007). In the study, the various networks were trained from a null network on both datasets, and did not use a larger dataset for pre-training (in contrast to some of the previous implementations). The implementations that took advantage of a different dataset for pre-training are indicated by a 'Y' in the pre-training column, while those that do not, are indicated by 'N'. When training from scratch the exemplary VNN was able to achieve best performance for both scenarios: one stream networks (RGB frames only) and two-stream networks (RGB frames & Optical Flow). To fuse the two information streams (spatial and temporal), the study evaluated a decision level fusion and a feature level fusion.

Table 3 further shows a comparison of the number of parameters used by the various embodiments of the exemplary VNN as compared to other CNN systems. The evaluation was conducted using video data with 60 frames information.

TABLE 3

| Method | Number of Parameters | Processing Speed (secs/video) |
|---|---|---|
| Deep Temporal Linear Encoding | 22.6M | — |
| Inflated 3D CNN | 25M | 3.52 |
| O-VNN (exact) | 4.6M | 0.73 |
| O-VNN (Q = 7) | 3.7M | 0.61 |
| Two-Stream O-VNN (exact) | 10.1M | 1.88 |
| Two-Stream O-VNN (Q = 7) | 8.2M | 1.54 |
| Two-Stream O-VNN (Q = 1) | 2.5M | 0.34 |

Indeed, the number of parameters executed by a VNN system is substantially lower than that of the comparable CNN system.

Example Feature Maps. FIGS. 3-6 shows example feature sets extracted using the exemplary VNN in accordance with an illustrative embodiment.

Figure 3:
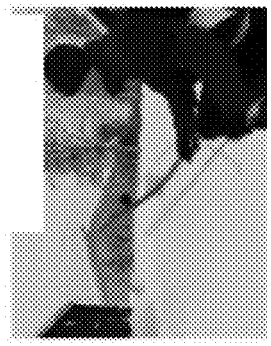
FIG. 3 shows example images used in a study to evaluate the exemplary VNN.
Figure 3:
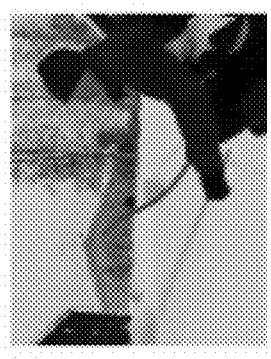
Figure 3:
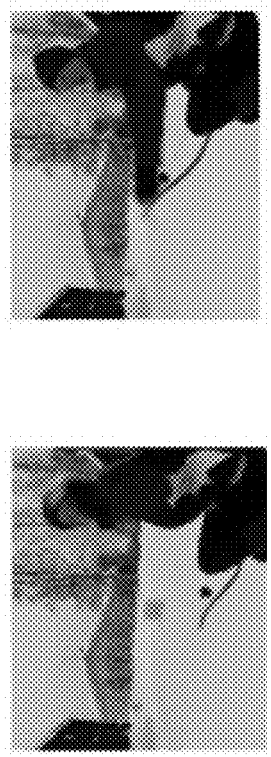
Figure 4B:
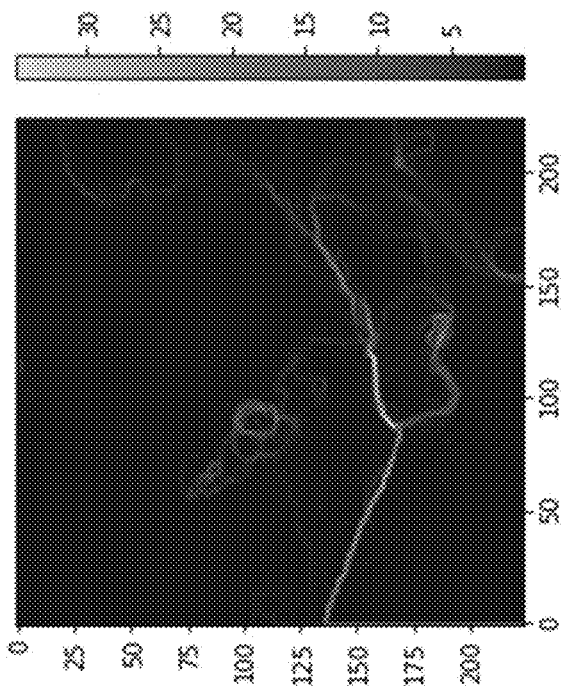
FIGS. 4A, 4B, and 4C each shows example feature sets extracted from the images of FIG. 3 using the exemplary VNN in an example application (for action recognition) in accordance with an illustrative embodiment.
Figure 4A:
Figure 4C:
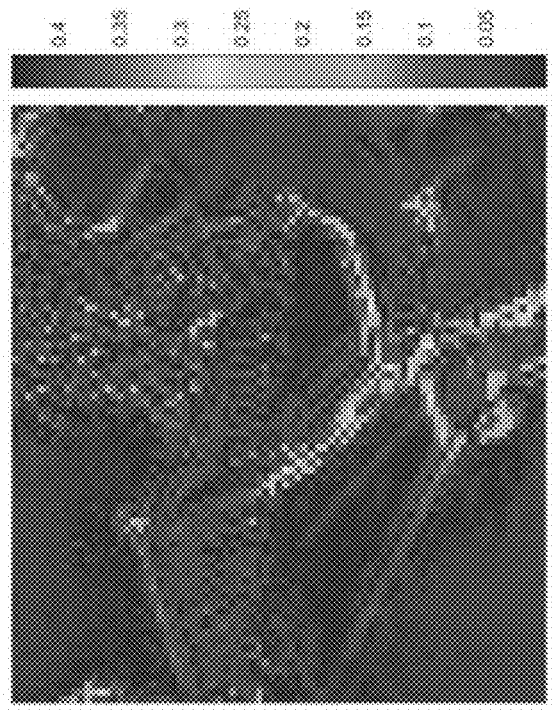

Specifically, FIG. 3 shows a first set of example input video frames of a video used in the study. FIG. 4A shows example features extracted from an only RGB stream of FIG. 3 using the exemplary VNN in accordance with an illustrative embodiment. FIG. 4B shows example features extracted from only an optical flow stream of FIG. 3 using the exemplary VNN in accordance with an illustrative embodiment. FIG. 4C shows output probability from the features of FIGS. 4A and 4B that can be used to classify a given action. In FIG. 4C, the high values indicate a high probability that a sequence of frames/feature is associated to a given action.

Figure 6C:
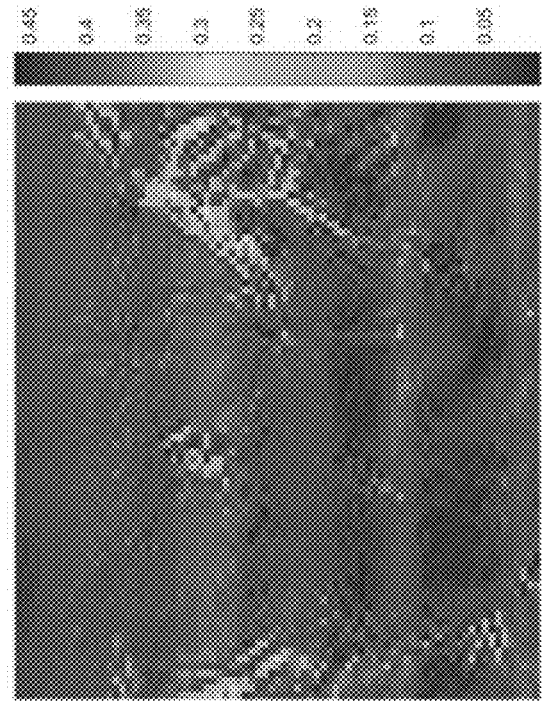

In addition, FIG. 5 shows a second set of example input video frames of a video used in the study. FIG. 6A shows example features extracted from an only RGB stream of FIG. 5 using the exemplary VNN in accordance with an illustrative embodiment. FIG. 5B shows example features extracted from only an optical flow stream of FIG. 5 using the exemplary VNN in accordance with an illustrative embodiment. FIG. 6C shows output probability from the features of FIGS. 5A and 5B that can be used to classify a given action. In FIG. 6C, the high values indicate a high probability that a sequence of frames/feature is associated to a given action.

In the study, an O-VNN with 8 layers on both the RGB stream and the optical stream was evaluated. Each layer used $L_z=2$ and $p_{1_z}, p_{2_z} \in \{0, 1, 2\}$. The outputs of the two filters were fed into the fusion layer which combined the two streams. The fusion layer used $L_{Fuse}=2$ and $p_{1_{Fuse}}, p_{2_{Fuse}} \in \{0, 1, 2\}$.

It is clear from Table 2 (above) that performing fusion using Volterra filters as discussed herein significantly boosts the performance of the system. The results showed that there does exist a non-linear relationship between the two modalities. The non-linear relationship can also be confirmed in the observation of significant values in the weights for the fusion layer (see Table 3). FIGS. 4A, 4B, 4C, 5A, and 5B show feature maps for an archery video and a fencing video. From FIGS. 4A, 4B, 4C, 5A, and 5B, it can be observed that when only the RGB stream is used, a lot of the background area has high values, while when both streams are jointly used, the system is able to concentrate on more relevant features.

In FIG. 4C, the VNN system can be seen to concentrate on the bow and arrow which are central to recognizing the action, while in FIG. 6B, the VNN system is seen to concentrate on the pose of the human which appears to central to identifying a fencing action.

Figure 7A:
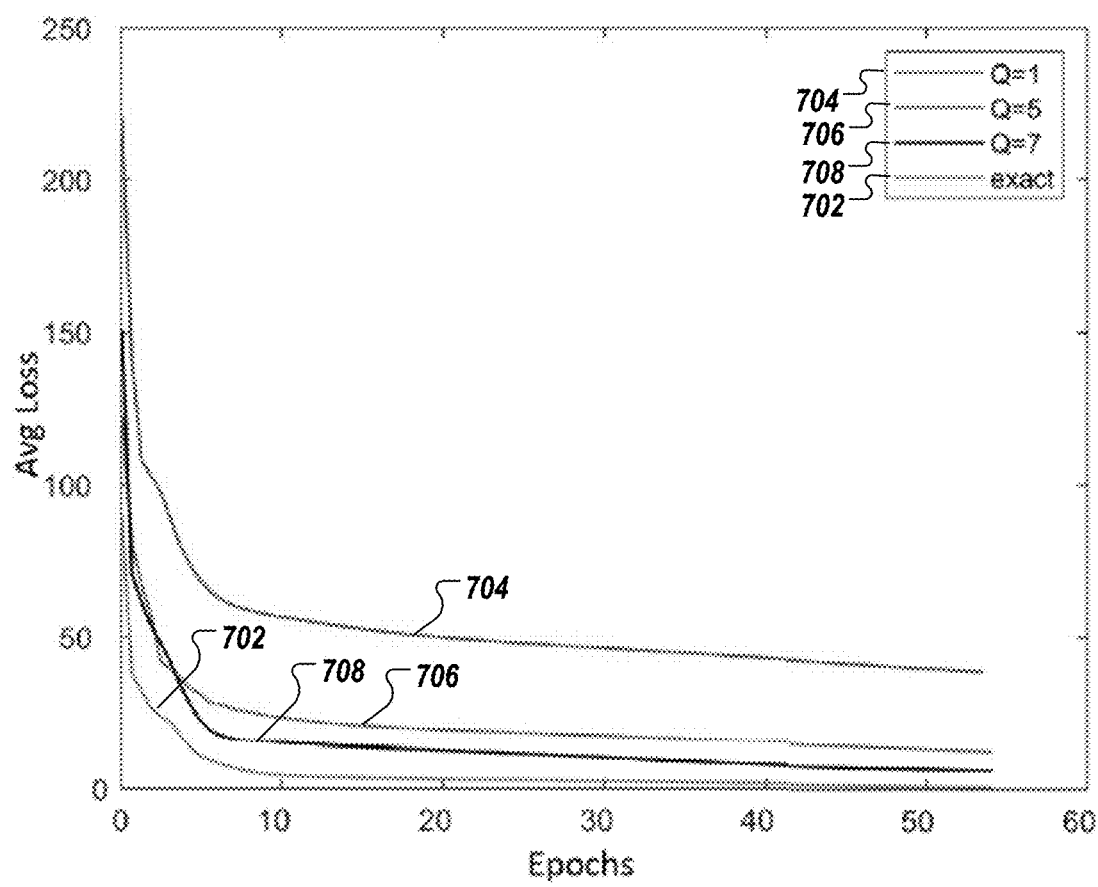
FIG. 7A shows aspects of the training of the exemplary VNN in accordance with an illustrative embodiment.

FIG. 7A shows a graph illustrating Epochs vs Loss for a Cascaded Volterra Filter when a different number of multipliers (Q) are used to approximate the 2nd order kernel. The line 702 in the plot shows the loss when the exact kernel is learned, and it can be seen that the performance comes closer to the exact kernel as Q is increased.

Figure 7B:
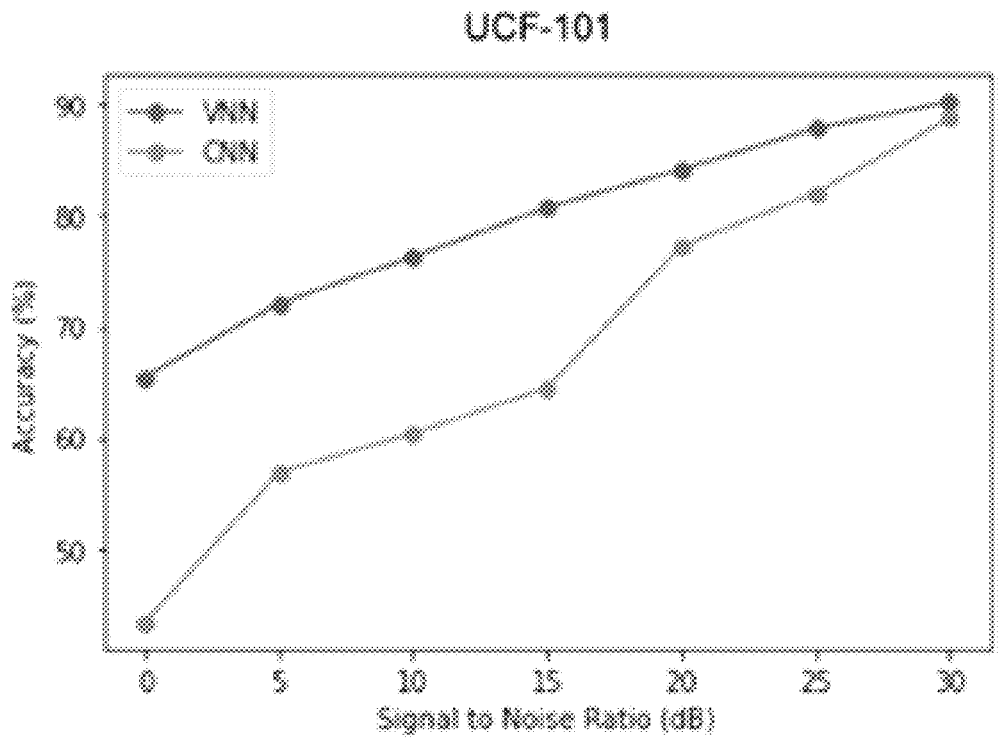
FIGS. 7B and 7C each shows results of an evaluation for robustness of the exemplary VNN in accordance with an illustrative embodiment.

FIG. 7B shows results of an evaluation for robustness of the exemplary O-VNN in presence of Gaussian noise and compares it with that of a CNN model (Carreira and Zisserman 2017) for action recognition. It is observed that the VNN model is much more robust to Gaussian noise and provides up to 20% improvement in classification accuracy. Furthermore, the VNN model experiences a graceful drop in performance compared to the CNN model which sees a severe drop at Signal to Noise Ratio (SNR) of 15 dB.

Figure 7C:
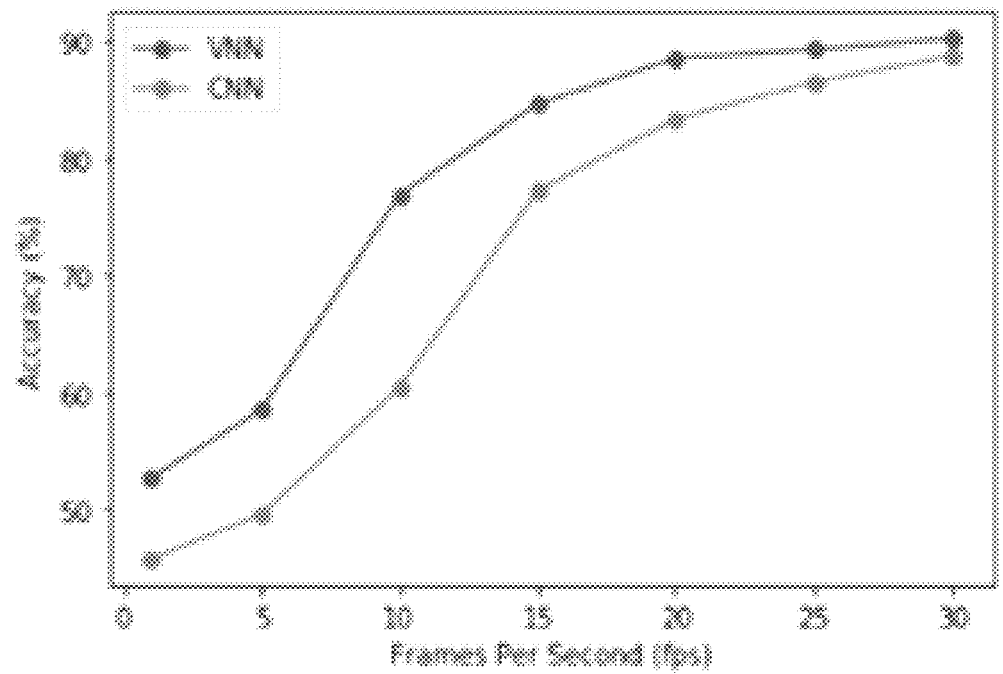

FIG. 7C show result of an evaluation of performance of the exemplary O-VNN when the number of frames per second (FPS) is reduced. This result illustrates that the VNN is better at modelling long term relationships in the time domain as compared to a CNN model. While unlike in the case of Gaussian noise, the VNN does see a significant drop in performance, it comes at a lower frame rate of 5 fps as compared to the 10 fps in the case of CNN.

Image Generation. To further demonstrate the capabilities of the exemplary VNN architecture, the VNN was implemented as a generator in a Generative Adversarial Network (GAN). In the GAN system, the VNN architecture was used jointly with a fixed dictionary as has been recently demonstrated in Stable GANs (STGANs) to stabilize the training process.

An additional study was conducted using the CIFAR10 dataset of 60,000 32×32 color images of objects from 10 classes with 50,000 images allotted for training and 10,000 images for validation. To generate a 32×32 image, the input noise vector was first transformed into a latent space using a fixed learned frame $\theta^*$. The generator uses two $2^{nd}$ order Volterra filter layers as opposed to four convolutional layers. The number of channels in the final layer was such that it was equal to the number of atoms in the fixed dictionary, which in this experiment was 384. The learned fixed dictionary $\theta^*$ was then multiplied by the generator output to produce generated image patches. The size of the dictionary in the experiment was 75×384. Table 4 shows experimental results of a comparison of number of parameters required and processing speed with the state of the art. A video with 60 frames is evaluated.

TABLE 4

| Method | Inception Score |
|---|---|
| WGAN | 5.95 |
| VNN-WGAN | 6.20 |
| SPGAN-recon | 6.70 |
| STGAN | 6.80 |
| Volterra STGAN | 7.05 |

Discussion Human action recognition is an important research topic in Computer Vision, and can be used towards surveillance, video retrieval, and man-machine interaction to name a few. The survey on Action Recognition approaches (Kong and Fu 2018) provides a good progress overview. Video classification usually involves three stages (Wang et al. 2009; Liu, Luo, and Shah 2009; Niebles, Chen, and Fei-Fei 2010; Sivic and Zisserman 2003; Karpathy et al. 2014), namely, visual feature extraction (local features like Histograms of Oriented Gradients (HoG) (Dalal and Triggs 2005), or global features like Hue, Saturation, etc.), feature fusion/concatenation, and lastly classification. In (Yi, Krim, and Norris 2011), an intrinsic stochastic modeling of human activity on a shape manifold is proposed and an accurate analysis of the non-linear feature space of activity models is provided.

The emergence of Convolutional Neural availability of large training datasets and computational resources has come a long way to obtaining the various steps by a single neural network. This approach has led to remarkable progress in action recognition in video sequences, as well as in other vision applications like object detection (Sermanet et al. 2013), scene labeling (Farabet et al. 2012), image generation (Goodfellow et al. 2014), image translation (Isola et al. 2017), information distillation (Roheda et al. 2018b; Hoffman, Gupta, and Darrell 2016), etc. In the Action Recognition domain, datasets like the UCF-101 (Soomro, Zamir, and Shah 2012), Kinetics (Kay et al. 2017), HMDB-51 (Kuehne et al. 2011), and Sports-1M (Karpathy et al. 2014) have served as benchmarks for evaluating various solution performances.

In action recognition applications, the exemplary VNN generally aligns along two themes: (1) one Stream CNN (only use either spatial or temporal information); (2) two Stream CNN (integrate both spatial and temporal information).

Many implementations (Carreira and Zisserman 2017; Diba, Sharma, and Van Gool 2017; Feichtenhofer, Pinz, and Zisserman 2016; Simonyan and Zisserman 2014) have shown that integrating both streams leads to a significant boost in recognition performance. In Deep Temporal Linear Encoding (Diba, Sharma, and Van Gool 2017), 2D CNNs (pre-trained on ImageNet (Deng et al. 2009)) was proposed to extract features from RGB frames (spatial information) and the associated optical flow (temporal information). The video is first divided into smaller segments for feature extraction via 2D CNNs. The extracted features are subsequently combined into a single feature map via a bilinear model. In that approach, when using both streams, is shown to achieve a 95.6% accuracy on the UCF-101 dataset, while only achieving 86.3% when only relying on the RGB stream. Carreira et al. (Carreira and Zisserman 2017) adopt the GoogLeNet architecture which was developed for image classification in ImageNet (Deng et al. 2009), and use 3D convolutions (instead of 2D ones) to classify videos. That implementation is referred to as the Inflated 3D CNN (I3D), and has been shown to achieve a performance of 88.8% on UCF-101 when trained from scratch, while achieving a 98.0% accuracy when a larger dataset (Kinetics) was used for pre-training the entire network (except for the classification layer).

While these Networks (CNNs) approaches achieve near perfect classification, the model are extremely heavy to train, and have a tremendous number of parameters (e.g., 25M in I3D, 22.6M in Deep Temporal Linear Encoding). This in addition, makes the analysis including the necessary degree of non-linearity, difficult to understand, and the tractability elusive.

The exemplary VNN can introduce controlled non-linearities through interactions between delayed samples of a time series. The exemplary VNN may be built on the formulations of the widely known Volterra Series (Volterra 2005) to accomplish this task.

While prior attempts to introduce non-linearity based on the Volterra Filter have been proposed (Kumar et al. 2011; Zoumpourlis et al. 2017), most have limited the development up to a quadratic form on account of the explosive number of parameters required to learn higher order complexity structure. While quadratic non-linearity is sufficient for some applications (e.g., system identification), it is highly inadequate to capture all the non-linear information present in videos.

Proposition #1. A VNN architecture can approximate any continuous function including activation functions like sigmoid/ReLU with an error margin defined by the Taylor Remainder Theorem.

Based on the Weistrass Approximation Theorem (Stone 1948) it is known that any continuous non-linear function can be approximated using a polynomial. Specifically, the taylor expansion of the non-linear function may be used, $$\sigma(x) = c^0 + c^1 x + c^2 x^2 + \ldots + c^k x^k + \ldots + c^\infty x^\infty.$$

For example, a sigmoid activation can be approximated as, $$\sigma_{sigmoid}(x) = \frac{1}{1+e^{-x}} = \frac{1}{2} + \frac{1}{4}x - \frac{1}{48}x^3 + \frac{1}{480}x^5 + \ldots \quad \text{(Proposition 1, Equation 1)}$$

As seen from Equation 1 the VNN formulation can learn exactly such an expansion up to a finite order, $$\sigma_{VNN}(x) = w_0 + w_1 x + w_2 x^2 + \ldots + w_k x^k, \quad \text{(Proposition 1, Equation 2)}$$

which is a $k^{th}$ order approximation of $\sigma(x)$. Here $w_k$ is the $k^{th}$ order weight and is learned during the training process. If set equal to the coefficients in Proposition Equation 1, the approximation of the sigmoid activation function can be determined.

Since a finite order polynomial expansion is used to approximate an infinite taylor expansion, the error between the two can be expressed via the Taylor Remainder Theorem, $$|\sigma(x) - \sigma_{VNN}(x)| \leq R_k = \left| \frac{\sigma^{k+1}(m)}{(k+1)!}(x-a)^{k+1} \right|$$

where the Taylor Expansion is centered around a and m lies between a and x.

Figure 8:
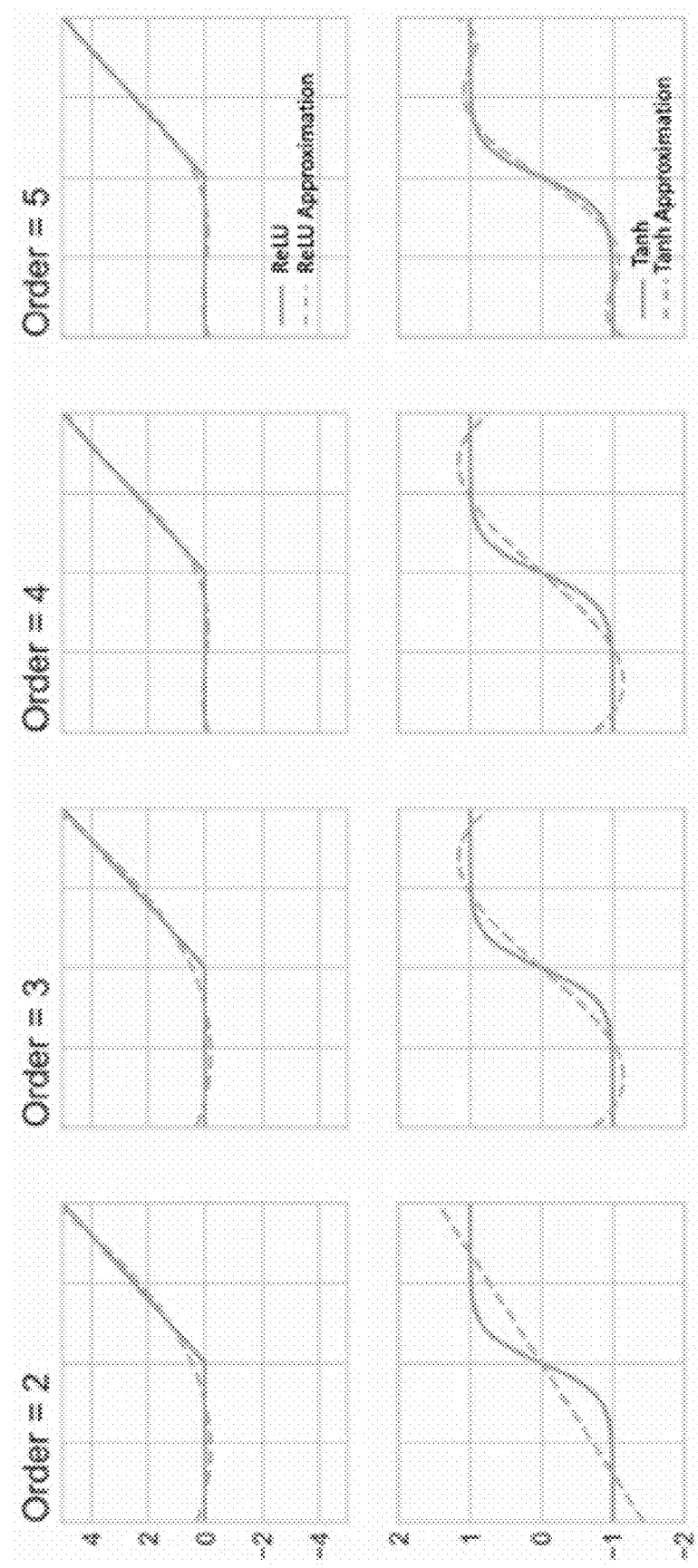
FIG. 8 shows examples of continuous functions approximated by the Volterra series in an exemplary VNN in accordance with an illustrative embodiment.

FIG. 8 shows the approximation of various activation functions via the Volterra series formulation. It is noted that $w_k$s in Proposition 1, Equation 2 are actually learnable weights and are updated based on the classification error when comparing the classifier output with the ground truth. Indeed, they do not have to be equal to coefficients in Proposition 1, Equation 1 or to that of any other activation function and the model actually learns the required non-linear function from the dataset itself.

Proposition #2. The following together indicate that the nonlinearity introduced by the Volterra architecture allows for a more optimal solution as compared with a standard activation function: (1) there exists a non-linear link between the weights describing the higher order features in case of a standard activation function; (2) for any activation function that can be approximated by a taylor series, $c_{n+1} < C_n \forall n \in \{0, \ldots, \infty\}$.

Proof. Consider an input $X = [x_1, x_2]$. A standard single layer neural network would take the dot product of X with the linear weights $W = [w_1, w_2]$ and apply an activation function $\sigma(\cdot)$ to get the output $y = \sigma(W^T \cdot X) = \sigma(w_1 x_1 + w_2 x_2)$.

As discussed in Proposition 1, the activation function (e.g., ReLU, sigmoid, tanh) $\sigma(\cdot)$ can be approximated by its Taylor series expansion. Considering a 2nd order approximation, $$y = c_0 + c_1(w_1 x_1 + w_2 x_2) + c_2(w_1 x_1 + w_2 x_2)^2 = c_0 + c_1 w_1 x_1 + c_1 w_2 x_2 + c_2 w_1^2 x_1^2 + c_2 w_2^2 x_2^2 + 2 c_2 w_1 w_2 x_1 x_2.$$

This can be rewritten as, $$y = \alpha_0 + \alpha_1 x_1 + \alpha_2 x_2 + \alpha_3 x_1^2 + \alpha_4 x_2^2 + \alpha_5 x_1 x_2. \quad \text{(Proposition 2, Equation 1)}$$

From Equation 20 and 21, $$\alpha_0 = c_0; \alpha_1 = c_1 w_1;$$

$$\alpha_2 = c_1 w_2; \alpha_3 = c_2 w_1^2;$$

$$\alpha_4 = c_2 w_2^2; \alpha_5 = c_1 c_2 w_1 w_2.$$

As a result, $$y = \alpha_0 + \alpha_1 x_1 + \alpha_2 x_2 + \frac{c_2}{c_1}\alpha_1^2 x_1^2 + \frac{1}{c_2}\alpha_2^2 x_2^2 + \frac{2}{c_1}\alpha_1 \alpha_2 x_1 x_2.$$

Clearly, there exists a non-linear link between the linear coefficients and the higher order ones. Such a non-linear link between the linear and higher order coefficients means that an optimal solution weight vector cannot be found. This also holds for any higher order approximation of the Taylor series. The second part of the proposition comes directly from the definition of a Taylor series. For an $n^{th}$ order taylor approximation we have, $$\sigma(x) = \sum_{n=0}^{N} \frac{\sigma^{(n)}(a)}{n!}(x-a)^n$$

where $\sigma^{(n)}(a)$ is the $n^{th}$ derivative of $\sigma$ at a. As seen from this equation the $n^{th}$ coefficient, $c_n$ is given as $$c_n = \frac{\sigma(n)(a)}{n!}.$$

As a result of the n! in the denominator, $c_{n+1} < c_n \forall n$.

This leads to diminishing importance of higher order features, and makes it difficult for the model to learn them even if they may be more discriminative. Rather, the Volterra series formulation assigns an independent learnable weight to each term in Proposition 2, Equation 1.

Proposition #3. If Z 2nd order filters are cascaded as shown in FIG. 1, the resulting Volterra Network has an effective order of $K_Z = 2^{2^{Z-1}}$.

Proof. Where each layer of an O-VNN is a $2^{nd}$ order Volterra Filter, the order at the $Z^{th}$ layer can be written in terms of the order of the previous layer, $$K_z = 2^p.$$

where, $K_{Z-1}$ is the order of the $(Z-1)^{th}$ layer. Since, this O-VNN merely includes $2^{nd}$ order layers, there exists some p such that, $$K_z = 2^p.$$

From the above two equations, $$2^p = K_{z-1}^2$$

Taking $\log_2$ on both sides, $$\log_2 2^p = \log_2 K_{z-1}^2$$

$$\Rightarrow p = 2 \log_2 K_{z-1}$$

$$\Rightarrow p = 2 \log_2 K_{z-2}^2$$

$$\Rightarrow p = 2^2 \log_2 K_{z-2}$$

$$\Rightarrow p = 2^{(Z-1)} \log_2 K_1$$

Since $K_1 = 2$ and $\log_2 2 = 1$, $$p = 2^{Z-1}.$$

Putting this in Proposition 3, Equation 1 results in, $$K_z = 2^{2^{Z-1}}.$$

Proposition #4. The complexity of a $K^{th}$ order cascaded Volterra filter may include the following number of parameters:

$$\sum_{z=1}^{Z}[(L_z \cdot [2p_{1_z} + 1] \cdot [2p_{2_z} + 1]) + \qquad \text{(Proposition 4, Equation 1)}$$

$$(L_z \cdot [2p_{1_z} + 1] \cdot [2p_{2_z} + 1])^2]$$

Proof. For a $2^{nd}$ order filter (K=2), the number of parameters required is $[(L \cdot [2p_1+1] \cdot [2e_2+1]) + (L \cdot [2p_1+1] \cdot [2p_2+1]^2)]$ per Equation 8. When such a filter is repeatedly applied Z times, it will lead to the number of parameters of Proposition 4, Equation 1 with order $K = 2^{2^{Z-1}}$.

Proposition #5. An O-VNN with Z layers is BIBO stable if $\forall_z \in \{1, \ldots, Z\}$, $$\sum_{\tau_1, \sigma_{11}, \sigma_{21}} \left| W^{z1}_{\begin{bmatrix}\tau_1 \\ \sigma_{11} \\ \sigma_{21}\end{bmatrix}} \right| + \sum_{\substack{\tau_1, \sigma_{11}, \sigma_{21} \\ \tau_2, \sigma_{12}, \sigma_{22}}} \left| W^{z2}_{\begin{bmatrix}\tau_1 \\ \sigma_{11} \\ \sigma_{21}\end{bmatrix}\begin{bmatrix}\tau_2 \\ \sigma_{12} \\ \sigma_{22}\end{bmatrix}} \right| < \infty.$$

Proof. Consider the $z^{th}$ layer in the Cascaded implementation of the Volterra Filter, $$F^z_{[1:M_z]} = \left[g_z\left(F^{z-1}_{[1:L_z]}\right) \, g_z\left(F^{z-1}_{[2:L_z+1]}\right) \, \cdots \, g_z\left(F^{z-1}_{[(M_z-1)-L_z+1:(M_z-1)]}\right)\right],$$

where $M_z = M_{z-1} - L_z + 1$. Then for $m_z \in \{1, \ldots, M_z\}$.

$$\left|F^z_{\begin{bmatrix}m_z \\ s_1 \\ s_2\end{bmatrix}}\right| + \left|g_z\left(F^{z-1}_{\begin{bmatrix}m_{z-1}-L_z+1:m_z \\ s_1-p_1:z_1+p_1 \\ s_2-p_2:s_2:p_2\end{bmatrix}}\right)\right|$$

Which can be expressed as, $$= \left| \sum_{\tau_1, \sigma_{11}, \sigma_{21}} W^{z1}_{\begin{bmatrix}\tau_1 \\ \sigma_{11} \\ \sigma_{21}\end{bmatrix}} f^{z-1}_{\begin{bmatrix}(L_z+m_z-1)-\tau_1 \\ s_1-\sigma_{11} \\ s_2-\sigma_{21}\end{bmatrix}} \right.$$

$$\left. + \sum_{\substack{\tau_1, \sigma_{11}, \sigma_{21} \\ \tau_2, \sigma_{12}, \sigma_{22}}} W^{z2}_{\begin{bmatrix}\tau_1 \\ \sigma_{11} \\ \sigma_{21}\end{bmatrix}\begin{bmatrix}\tau_2 \\ \sigma_{12} \\ \sigma_{22}\end{bmatrix}} f^{z-1}_{\begin{bmatrix}(L_z+m_z-1)-\tau_1 \\ s_1-\sigma_{11} \\ s_2-\sigma_{21}\end{bmatrix}} f^{z-1}_{\begin{bmatrix}(L_z+m_z-1)-\tau_2 \\ s_1-\sigma_{12} \\ s_2-\sigma_{22}\end{bmatrix}} \right|$$

Which can be expressed as, $$\leq \sum_{\tau_1, \sigma_{11}, \sigma_{21}} \left| W^{z1}_{\begin{bmatrix}\tau_1 \\ \sigma_{11} \\ \sigma_{21}\end{bmatrix}} \right| \left\| f^{z-1}_{\begin{bmatrix}(L_z+m_z-1)-\tau_1 \\ s_1-\sigma_{11} \\ s_2-\sigma_{21}\end{bmatrix}} \right\|$$

$$+ \sum_{\substack{\tau_1, \sigma_{11}, \sigma_{21} \\ \tau_2, \sigma_{12}, \sigma_{22}}} \left| W^{z2}_{\begin{bmatrix}\tau_1 \\ \sigma_{11} \\ \sigma_{21}\end{bmatrix}\begin{bmatrix}\tau_2 \\ \sigma_{12} \\ \sigma_{22}\end{bmatrix}} \right| \left\| f^{z-1}_{\begin{bmatrix}(L_z+m_z-1)-\tau_1 \\ s_1-\sigma_{11} \\ s_2-\sigma_{21}\end{bmatrix}} \right\| \left\| f^{z-1}_{\begin{bmatrix}(L_z+m_z-1)-\tau_2 \\ s_1-\sigma_{12} \\ s_2-\sigma_{22}\end{bmatrix}} \right|.$$

This equation states that a bounded input yields, $$\sum_{\tau_1,\sigma_{11},\sigma_{21}} \left| f^{z-1}_{\begin{bmatrix}(L_z+m_z-1)-\tau_1\\s_1-\sigma_{11}\\s_2-\sigma_{21}\end{bmatrix}} \right| \leq A, \text{ for some } A < \infty.$$

Hence, the sufficient condition for the system to be BIBO stable is, $$\sum_{\tau_1,\sigma_{11},\sigma_{21}} \left| W^{z-1}_{\begin{bmatrix}\tau_1\\\sigma_{11}\\\sigma_{21}\end{bmatrix}} \right| + \sum_{\tau_1,\sigma_{11},\sigma_{21}\atop\tau_2,\sigma_{12},\sigma_{22}} \left| W^{z-2}_{\begin{bmatrix}\tau_1\\\sigma_{11}\\\sigma_{21}\end{bmatrix}\begin{bmatrix}\tau_2\\\sigma_{12}\\\sigma_{22}\end{bmatrix}} \right| < \infty.$$

If the input data (i.e., video frames) is bounded, so is the output of each layer provided that above equation is satisfied $\forall_z \in \{1, \ldots, Z\}$, making the entire system BIBO stable.

Proposition #6. An O-VNN as described herein can be shown to be stable and convergent under the condition $|x_t| < p < 1$, where $x_t$ is the input to the filter, and p is the radius of convergence for the Volterra Filter.

Proof. A Volterra Filter can be viewed as a power series, $$y_t \sum_{k=1}^{K} g_k[ax_t] = \sum_{k=1}^{K} a^k g_k[x_t], \quad \text{(Prosposition 6, Equation 1)}$$

where a is an amplification factor and, $$g_k[x_t] = \sum_{\tau_1,\ldots,\tau_k} W^k_{[\tau_1,\ldots,\tau_k]} x_{t-\tau_1} x_{t-\tau_2} \cdots x_{t-\tau_k}.$$

In general, for a power series $$\sum_{k=1}^{\infty} c_k x^k,$$

converges only for $|x| < p$, where $p = (\lim_{k \to \infty} \sup |c_k|^{1/k})^{-1}$ (Rudin others 1964). Setting a=1 in Proposition 6, Equation 1 and replacing the coefficients $c_k$ with the $k^{th}$ order Volterra Kernel $W_k$, $$p = (\lim_{k \to \infty} \sup |W^k|^{1/k})^{-1}.$$

Furthermore, since the system must also satisfy the BIBO stability condition, $$|x_t| = (\lim_{k \to \infty} \sup |W^k|^{1/k})^{-1} < \infty.$$

Proposition #7. The approximation discussed in Equation 10 is a $Q^{th}$ rank approximation of the exact quadratic kernel, $W^2$ Proof. For simplicity, consider a 1-D Volterra Filter with memory, L. The quadratic weight matrix, $W^2$ in such a case is of size L×L, and Equation 10 becomes, $$W^{2(Q)}_{L \times L} = \sum_{q=1}^{Q} W^2_{a_{q_{L \times 1}}} W^2_{b_{q_{1 \times L}}}.$$

Consider the Singular Value Decomposition of the quadratic weight matrix, $W^2$, $$W^2 = U\Sigma V^T$$

where U and V are L×L matrices, and is a diagonal matrix with singular values on the diagonal. The above equation can be re-written as, $$W^2 = \sum_{q=1}^{L} u_q \sigma_q v_q^T,$$

where, $u_q$ and $v_q$ are the $q^{th}$ column of U and V respectively, and $\sigma_q$ is the $q^{th}$ diagonal element of $\Sigma$. A $Q^{th}$ rank approximation is then given as, $$W^{2(Q)} = \sum_{q=1}^{Q} u_q \sigma_q v_q^T$$

$$= \sum_{q=1}^{Q} \hat{u}_q v_q^T,$$

where $\hat{u} = u_q \cdot \sigma_q$. If $W_{a_q}^2 = \hat{u}_q$ and $W_{b_q}^2 = v_q^T$, $$W^{2(Q)} = \sum_{q=1}^{Q} W^2_{a_q} W^2_{b_q}.$$

Hence, the approximation discussed in Equation 10 is a $Q^{th}$ rank approximation of the exact quadratic kernel.

Figure 9:
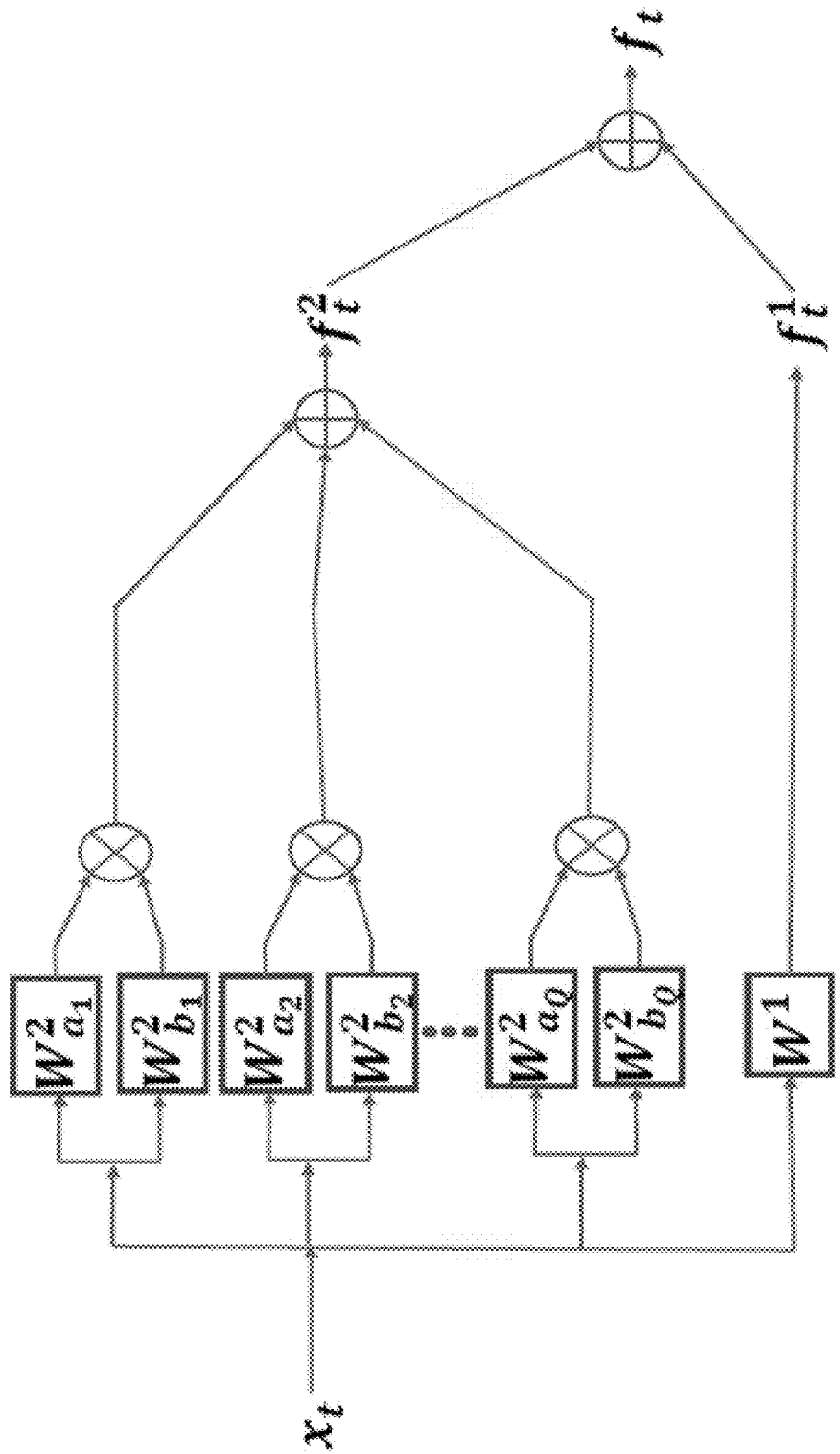
FIG. 9 shows an implementation of a $2^{nd}$ order filter in an exemplary VNN using a $Q^{th}$ rank approximation in accordance with an illustrative embodiment.

The matrices $W_{a_q}^2$ and $W_{b_q}^2$ are unknown beforehand and are learned as part of the training process driven by the classification performance of the system. FIG. 9 illustrates the implementation of a $2^{nd}$ order filter using a $Q^{th}$ rank approximation.

Experimental Results and Additional Example Using VNNs for Sensor Fusion

Another example of VNN is disclosed herein in which a deep structure encoder configured with a Volterra Neural Networks (VNN) is used to seek a latent representation of multi-modal data whose features are jointly captured by union of subspaces. The so-called self-representation embedding of the latent codes simplified the fusion which was driven by a similarly constructed decoding as described above. The Volterra filter architecture leads to a reduction in the required number of parameters due to controlled non-linearities being introduced by the higher order convolutions in contrast to generalized activation functions. Experimental results on two different datasets have shown a significant improvement in the clustering performance for VNN auto-encoder over conventional Convolutional Neural Network (CNN) auto-encoder. In addition, the exemplary VNN-based auto-encoder has improved sample complexity over CNN-based auto-encoder while maintaining robust classification performance.

Introduction. Convolutional Neural Network (CNN) has been widely used in deep learning for analyzing visual images in many applications. These application additionally include but not limited to image processing, segmentation, and segmentation. However, the complexity and price of implementing CNNs can be limiting to some applications. Inspired by the Volterra series [1'], an efficient Volterra Neural Network (VNN) has been recently proposed [2'] to overcome the CNN over parametrization problem. The VNN filter architecture can control the non-linearities introduced in the network through controlling the degree of the interactions between the delayed input samples of the data. The cascaded implementation discussed in [2'], which is incorporated by reference herein in its entirety, has shown to significantly reduce the number of parameters needed for training the network as compared to conventional neural networks. In addition to reducing the network complexity, Volterra Neural Network (VNN) have more tractable and comprehensible structure. The use of Volterra filter in neural networks is not new, it has been previously introduced in [3'] and [4']. However, those implementation have been shown to be limited in the degree of the non-linearities that it can be ascertained, after which the number of parameters can explode depending on the non-linear content of the data.

With recent advances in sensor technology, multimodal data have become widely available and usable. Additional modalities can grant additional integral information as compared to unimodal data. A principled integration of multimodal sensor data might boost the data structure and improve the quality of extracted features. Multi-modal fusion has been extensively used in different applications including but not limited to image fusion [5'], target recognition [6'], speaker recognition [7'] and handwriting analysis [8']. In addition, CNNs have been extensively utilized for multimodal data analysis as in [9'] [12'] and [13']. However, the complexity of implementing multi-modal fusion network still persists.

An efficient implementation of the Deep Multi-modal Subspace clustering auto-encoder [16'] is disclosed herein using Volterra filters. More specifically, the CNNs are replaced with VNNs which controls the introduced non-linearities via high order convolutions instead of using highly non-linear activation functions as in [16'] architecture. Moreover, additional features may be included to reduce the number of parameters needed to train the VNN auto-encoder to a fraction of the number of parameters used by CNNs while retaining a comparable clustering performance.

In this example, the exemplary Volterra network architecture is configured as an efficient Volterra Filter auto-encoder for multi-modal data fusion. The introduced framework extracted the underlying embedding of each data modality under the assumption of data self-representation. Experimental results show a significant improvement for Volterra filter network over the convolutional neural network autoencoder.

Figure 10:
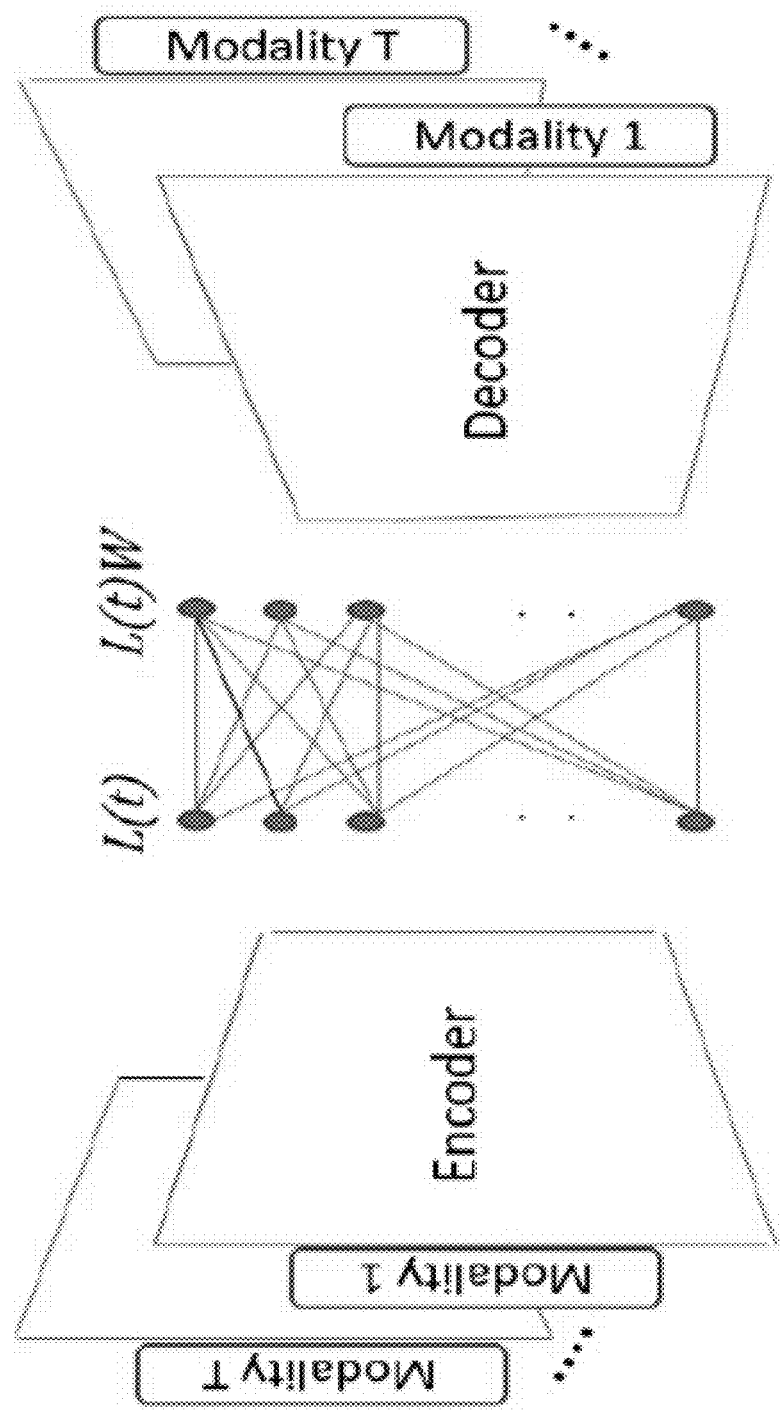
FIG. 10 shows an affinity Fusion Deep Multimodal Subspace clustering (AFDMSC) network.

Affinity Fusion Deep Multimodal Subspace Clustering. FIG. 10 shows an affinity Fusion Deep Multimodal Subspace clustering (AFDMSC) network, e.g., as described in [16']. The affinity Fusion Deep Multimodal Subspace clustering network includes a multimodal encoder, a self-expressive layer, and a multimodal decoder. The output of the encoder contributes to a common latent space for all modalities. The self-expressiveness property applied through a fully connected layer between the encoder and the decoder results in one common set of weights for all the data sensing modalities.

The reconstruction of the input data by the decoder, can yield the following loss function to secure the proper training of the self-expressive network, per Equation 16:

$$\min_{W/w_{kk}=0} \|W\|_2 + \frac{\gamma}{2}\sum_{t=1}^{T}\|X(t) - X_r(t)\|_F^2 + \frac{\mu}{2}\sum_{t=1}^{T}\|L(t) - L(t)W\|_F^2, \quad \text{(Equation 16)}$$

where W represents the parameters of the self-expressive layer, X(t) is the input to the encoder, $X_r(t)$ denote the output of the decoder and L(t) denotes the output of the encoder. $\mu$, and $\gamma$ are regularization parameters.

Figure 11:
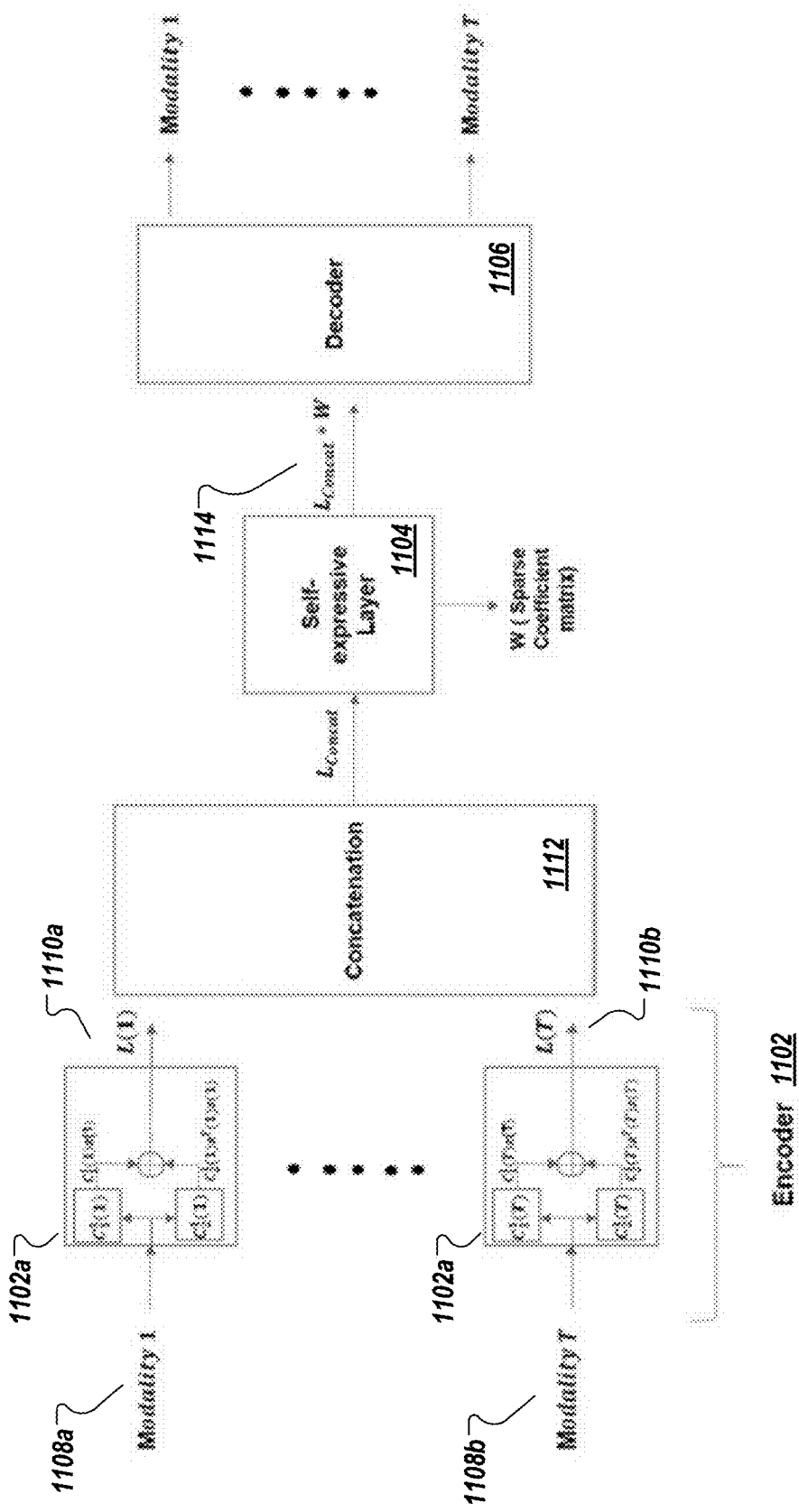
FIG. 11 shows an exemplary Volterra Filter Auto-encoder in accordance with an illustrative embodiment.

Volterra Filter Subspace Clustering. FIG. 11 shows an exemplary Volterra Filter Auto-encoder 1100 (also referred to herein as "VNN-AE" 1100) in accordance with an illustrative embodiment. As shown in FIG. 11, the Volterra Filter Auto-encoder 1100 includes a Volterra-based multi-modal encoder 1102, a self-expressive layer 1104, and the multi-modal decoder 1106. The exemplary VNN-AEs may be used to replaces the standard CNNs shown in [2']. The multi-modal encoder 1102 includes T number of parallel Volterra NNs. Each branch (shown as 1102a, 1102b in this example) of the encoder 1102 processes one of the modalities 1108 (shown as 1108a and 1108b) and extracts relevant features 1110 (shown as 1110a and 1110b). The T feature maps are concatenated (e.g., shown in the figure with a concatenation operator 1112) following this operation to provide a common latent space.

The self-expressive layer 1104 is configured to enforce the self-expressive property among the concatenated features. The self-expressive property is enforced, as shown in FIG. 11, by a fully connected layer which operates on the concatenated output of the encoder.

The decoder 1106 is configured to reconstruct input data from the self-expressive layers' output 1114. The objective function sought through this approximation network is reflected in Equation 17:

$$\min_{W/w_{kk}=0} \|W\|_1 + \frac{\gamma}{2}\sum_{t=1}^{T}\|X(t) - X_r(t)\|_F^2 + \quad \text{(Equation 17)}$$

$$\frac{\mu}{2}\|L_{concat} - L_{concat}W\|_F^2,$$

where $X_r(t)$ represents the reconstructed data corresponding to modality t, and $L_{concat}$ is the concatenation of L(1), e(2); . . . , L(T), where L(t) is the output of the encoder corresponding to modality t. W is the sparse weight function that ties the concatenated features. The above cost function is optimized, in some embodiments, in Tensorflow using an adaptive momentum based gradient descent method (ADAM) [17']. Under a suitable arrangement/permutation of the data realizations, the sparse coefficient matrix W is an n×n block-diagonal matrix with zero diagonals provided that each sample is represented by other samples only from the same subspace. More precisely, $W_{ij}$=0 whenever the indexes i,j correspond to samples from different subspaces. As a result, the majority of the elements in W are equal to zero. $\| \|_1$ denotes the l1 norm, i.e., the sum of absolute values of the argument.

After computing the gradient of the loss function, the weights of each multi-layer network, that corresponds to one modality, are updated while other modalities' networks are fixed. In other words, after constructing the data during the forward pass, the loss function may determine the updates that back-propagates through each layer. The encoder 1102 of the first modality is updated, following which, the self-expressive layer 1104 of that modality gets updated and finally the decoder 1106.

Problem Formulation Volterra Filter Subspace Clustering. Consider a set of data realizations indexed by k=1, 2, . . . , n. Furthermore, assume T data modalities, indexed by t=1, 2, 3, . . . , T. Each data realization can be represented as a m-dimensional vector $x_k(t) \in \mathfrak{R}^m$, where X(t)=[$x_1$(t)

$x_2(t) \ldots x_n(t)$]. The goal is to partition a set of realizations into clusters whose respective measurements for each modality is well-represented by a low-dimensional subspace. Mathematically, this is tantamount to seeking a partitioning $\{X^1(t), X^2(t), \ldots, X^P(t)\}$ of [n] observations, where P is the number of clusters indexed by p, such that there exist linear subspaces $S^p(t) \subset \Re^m$ with $\dim(S^p(t)) \ll m$. Let $x_k(t) \in S^p(t) \forall t$ and $k \in X^p$.

The Volterra Neural Network Auto-Encoder (VNN-AE) may exploit the self-expressive property (e.g., as generally described in [14'] and [15']) to acquire the latent space structure that reveals the relationships between data points in each cluster. The self-representation property entails that each sample can be represented as a linear combination of all other samples from the same subspace/cluster.

Class Partitioning. To proceed with distinguishing the various classes in an unsupervised manner, the affinity matrix is evaluated, e.g., as detailed in [18']. The affinity matrix is computed in some embodiments as:

$$A = W + W^T \qquad \text{(Equation 18)}$$

where $A \in \Re^{n \times n}$. Briefly, a matrix D is defined to be a diagonal matrix whose $i^{th}$ diagonal element is the degree of the $i^{th}$ node, i:e, the sum of $i^{th}$ row in A. The standard graph Laplacian matrix can then be constructed as follows, $$G = D^{-1/2} A D^{-1/2}, \qquad \text{(Equation 19)}$$

where $G \in \Re^{n \times n}$. Next, the eigenvectors $e_1, e_2, \ldots, e_r$ of G corresponding to the largest r eigenvalues are computed, where r is the desired number of clusters. The matrix $E = [e_1, e_2, \ldots, e_r]$ is then formed by stacking the eigenvectors in columns. Each row of E is a point in $\Re^r$, k-means clustering is then used to cluster the rows of E. Finally, the original point $x_i$ is assigned to cluster j iff row i of the matrix E was assigned to cluster j.

Experimental Results

Figure 12B:
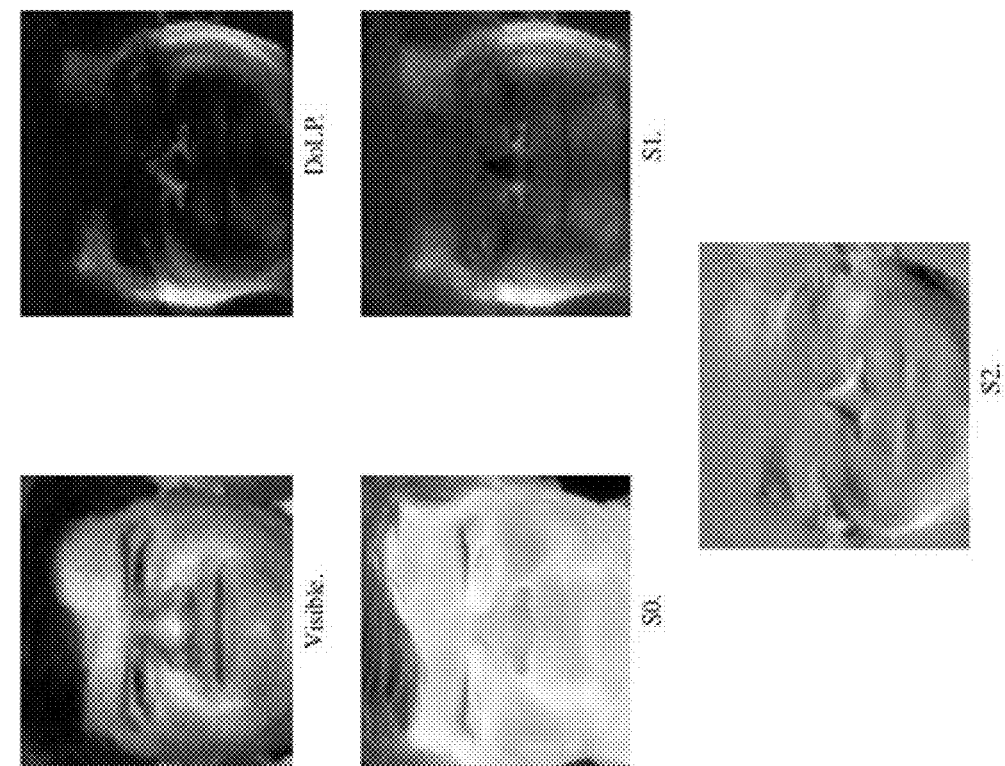
FIGS. 12A and 12B each shows a sample image used in a study to evaluate the Volterra Neural Network Auto-Encoder.
Figure 12A:
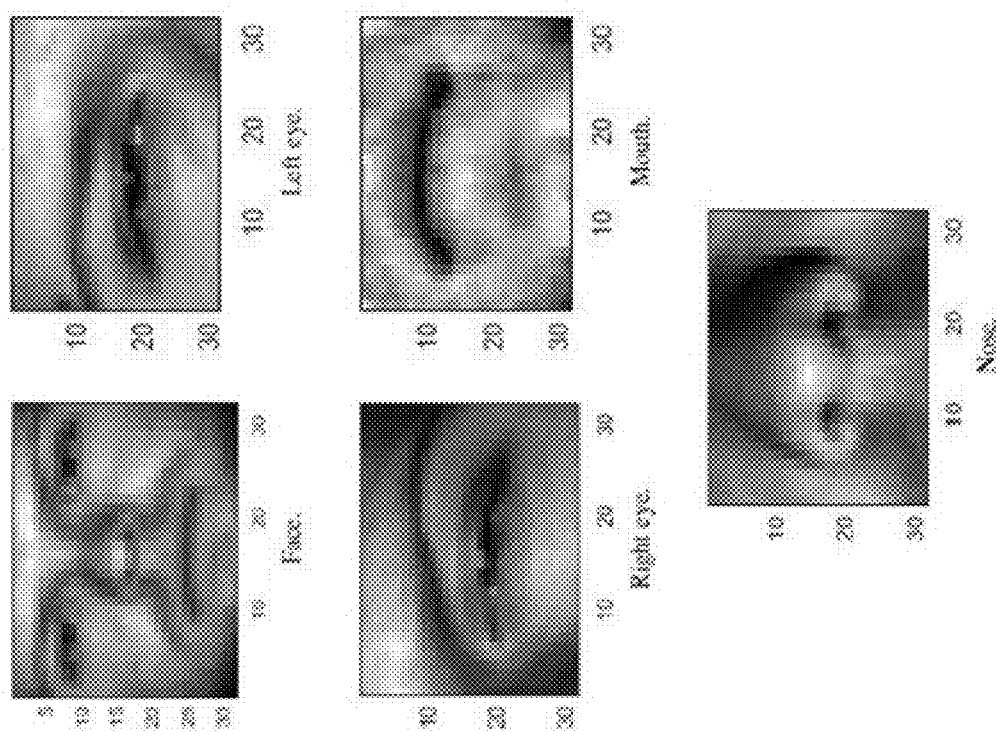

Dataset description. Another study was conducted to substantiate the VNN-AE—the study used two different datasets. The first dataset employed is the Extended Yale Dataset [19'] used extensively in subspace clustering as in [14'], [20']. FIG. 12A shows a sample image from the Extended Yale Dataset used in the study of the Volterra Neural Network Auto-Encoder. The dataset includes 64 frontal images of 38 individuals under different illumination conditions. In this study, augmented data were used as described in [16'], where facial components such as left eye, right eye, nose and mouth have been cropped to represent four additional modalities which are spatially unrelated. Images corresponding to each modality have been cropped to a size of 32×32.

The second validation dataset employed in the study was the ARL polarimetric face dataset [21']. The dataset includes facial images for 60 individuals in the visible domain and in four different polarimetric states. FIG. 12B shows a sample image from the ARL polarimetric face dataset used in the study of the Volterra Neural Network Auto-Encoder. The dataset was collected using a polarimetric long-wave infrared imager, to facilitate cross-spectrum face recognition research. Different polarization states of thermal emissions can provide extra geometric and textural facial details, which can be used to improve face identification.

The Stokes parameters S0, S1, S2, and S3 are often used to represent polarization-state information. They are collected by measuring the radiant intensity transmitted through a polarizer that rotates at different angles. S0 represents the conventional total intensity thermal image, S1 captures the horizontal and vertical polarimetric information, and S2 captures the diagonal polarimetric information. S1 and S2 capture orthogonal, yet complementary, polarimetric information. The degree-of-linear-polarization (DoLP) describes the portion of an electromagnetic wave that is linearly polarized. All the images are spatially aligned for each subject. We have also resized the images to 3232 pixels.

Network Structure. In the study, a VNN (comprising the VNN-AE) was constructed for each dataset. For both datasets, the data corresponding to each modality goes into the corresponding encoder (e.g., 1102). The encoder (e.g., 1102) projects the input modality into a feature space. Features are extracted from each modality independently, and are subsequently concatenated (e.g., via module 1112) before going through the self-expressive layer (e.g., 1104). The input to the self-expressive represents the data modalities' projection into the latent space. The second component of the Volterra filter auto-encoder is the self-expressive layer (e.g., 1104). The operation of this layer (e.g., 1104) is to enforce the self-representation property among the features extracted from each data modality, utilizing a fully connected layer which operates on the merged features. The decoder (e.g., 1106) reconstructs the input data from the self-expressive layers' output and has the same structure as the encoder.

As in [16'], a Volterra filter autoencoder was implemented with Tensorflow and used the adaptive momentum based gradient descent method (ADAM) [17'] to minimize the loss function in Equation 16 with a learning rate of $10^{-3}$ for ARL dataset and $10^{-4}$ for EYB dataset.

ARL Dataset: The ARL dataset includes five data modalities. For the study, the VNN auto-encoder was configured with five different encoders, one self-expressive layer, and five decoders. Each encoder includes a $2^{nd}$ order Volterra Filter as described herein. The Volterra filter includes three filters of kernel size 1 and two filters of kernel size 3. The decoder has the same structure as the encoder.

EYB Dataset: The EYB dataset also includes five data modalities. For the study, the VNN auto-encoder was configured with five encoders (one for each of the modalities), one self-expressive layers, and five decoders. Each encoder also includes a $2^{nd}$ order Volterra Filter. The Volterra filter includes seven filters of kernel size 1, seven filters of kernel size 3, and six filters of kernel size 5.

Fusion Results: The study evaluated the performance of the exemplary Volterra filter auto-encoder against the convolutional auto-encoder DMSC network. The study divided each dataset into learning and validation sets. For both datasets, the study trained each auto-encoder using 75% of the data and validated using the remaining 25%. The Union of Subspaces structure learned during training was then utilized to classify new observed data points in the test set. The sparse solution W provided important information about the relations among data points, which may be used to split data into individual clusters residing in a common subspace. Observations from each object can be seen as data points spanning one subspace. Interpreting the subspace-based affinities based on W, the study proceeded to carry out modality fusion. For clustering by W, the study applied the spectral clustering approach described in relation to Equations 18 and 19.

After learning the structure of the data clusters, the study validated the results on the validation set. The study extracted the principal components (eigenvectors of the covariance matrix) of each cluster in the original (training) dataset, to act as a representative subspace of its corresponding class. The study subsequently projected each new test point onto the subspace corresponding to each cluster, spanned by its principal components. The l2 norm of the projection was then computed, and the class with the largest norm was selected to be the class of this test point. The study then compare the clustering output labels with the ground truth for each dataset.

Tables 5 and 6 show results of the study for EYB and ARL datasets, respectively. From the results, it can be seen that the Volterra filter auto-encoder outperforms the DMSC network, while reducing the number of parameters needed to carry out the clustering task. This improvement may be attributed to the feature of the Volterra filter network in maintaining a tractable structure that controls the non-linearities introduced in the system as compared to the CNN network that can introduce infinite undesirable non-linearities.

TABLE 5

|      | Training | Testing | Number of Parameters |
|------|----------|---------|----------------------|
| DMSC | 98.82%   | 98.89%  | 2,367,400            |
| VFSC | 99.34%   | 99.23%  | 2,332,800            |

TABLE 6

|      | Taming   | Testing | Number of Parameters |
|------|----------|---------|----------------------|
| DMSC | 97.59%   | 98.33%  | 4,667,720            |
| VFSC | 99.95%   | 98.76%  | 4,666,650            |

Training with Less Data. The study also evaluated the performance of the exemplary Volterra filter auto-encoder with limited training data. A major challenge for any deep neural-network can be the availability of enough data to train the network. The study also assessed the exemplary data fusion network versus the convolutional deep neural network, DMSC, in case of limited data availability during training. The study trained the auto-encoder structure using portions of the available data, i.e., 25%, 40%, 50%, 60%, and 75%. Tables 7 and 8 shows the results for the ARL and EYB dataset, respectively.

TABLE 7

| Dataset  | VFSC   | No. parameters | DMSC   | No. of parameters |
|----------|--------|----------------|--------|-------------------|
| ARL 25%  | 99.32% | 519,450        | 93.33% | 520,520           |
| ARI 40%  | 99.42% | 1,328,154      | 94%    | 1,329,224         |
| ARL 50%  | 99.56% | 2,074,650      | 94.17% | 2,075,720         |
| ARL 60%  | 99.9%  | 2,987,034      | 95.69% | 2,988,104         |
| ARL 75%  | 99.95% | 4,666,650      | 97.59% | 4,667,720         |

TABLE 8

| Dataset  | VFSC   | No. parameters | DMSC   | No. of parameters |
|----------|--------|----------------|--------|-------------------|
| EYB 25%  | 95.58% | 279,112        | 93.33% | 313,712           |
| EYB 40%  | 97.25% | 679,580        | 94%    | 714,180           |
| EYB 50%  | 98.4%  | 1,049,244      | 94.17% | 1,083,844         |
| BYB 60%  | 98.96% | 1,501,056      | 95.69% | 1,333,656         |
| EYB 75%  | 99.34% | 2,332,800      | 97.59% | 2,367,400         |

From the results, it is clear that fusing the data using Volterra filter autoencoder significantly boosts the clustering accuracy while using less parameters than DMSC. In addition, the Volterra filter autoencoder is shown to be more robust and less sensitive to limited data availability during training.

D. Network Pruning. In another aspect, the auto-encoder network is further configured to with reduced number of parameters using network pruning techniques. From Tables 5 and 6, it can be observed that the total number of parameters appears to be dominated by the self-expressive layer parameters, which is a function of $O(N^2)$, where N is the number of samples in the dataset. As a result, this may lead to longer training time and require a lot of computational resources.

To reduce the number of parameters, a method was employed to randomly remove a ratio of the edges in the self-expressive layer and to train the network with the remaining edges. Because the self-representation coefficient matrix W should be sparse with a block-diagonal structure, the clustering performance should not be highly affected when appropriate number of edges and eliminated and set equal to zero. Indeed, most of the edges may eventually be equal to zero.

In addition to training the network with less data, the number of edges that is needed to be trained may be reduced by setting a fixed ratio of those edges to be equal zero and ignoring them while training as if they do not exist. In FIGS. 5 and 6, the error bar is shown in which 10%, 30%, 50% and 70% of the edges are removed from the self-expressive layer for the ARL and EYB dataset study, respectively. The results were averaged over 10 trials.

From the results, it is observed that the exemplary VF auto-encoder network is more robust to the changes in the self-expressive layer connections as compared to DMSC. Indeed, as edges from the self-expressive layer are removed, the performance degradation of VNN-AE is more graceful. In addition, the Volterra Filter auto-encoder appears to be less sensitive to training with less data as compared to DMSC network, which may be attributed to the lower number of parameters in the encoder and decoder which prevents overfitting when lower number of samples are available.

Exemplary Computing Device

Figure 13:
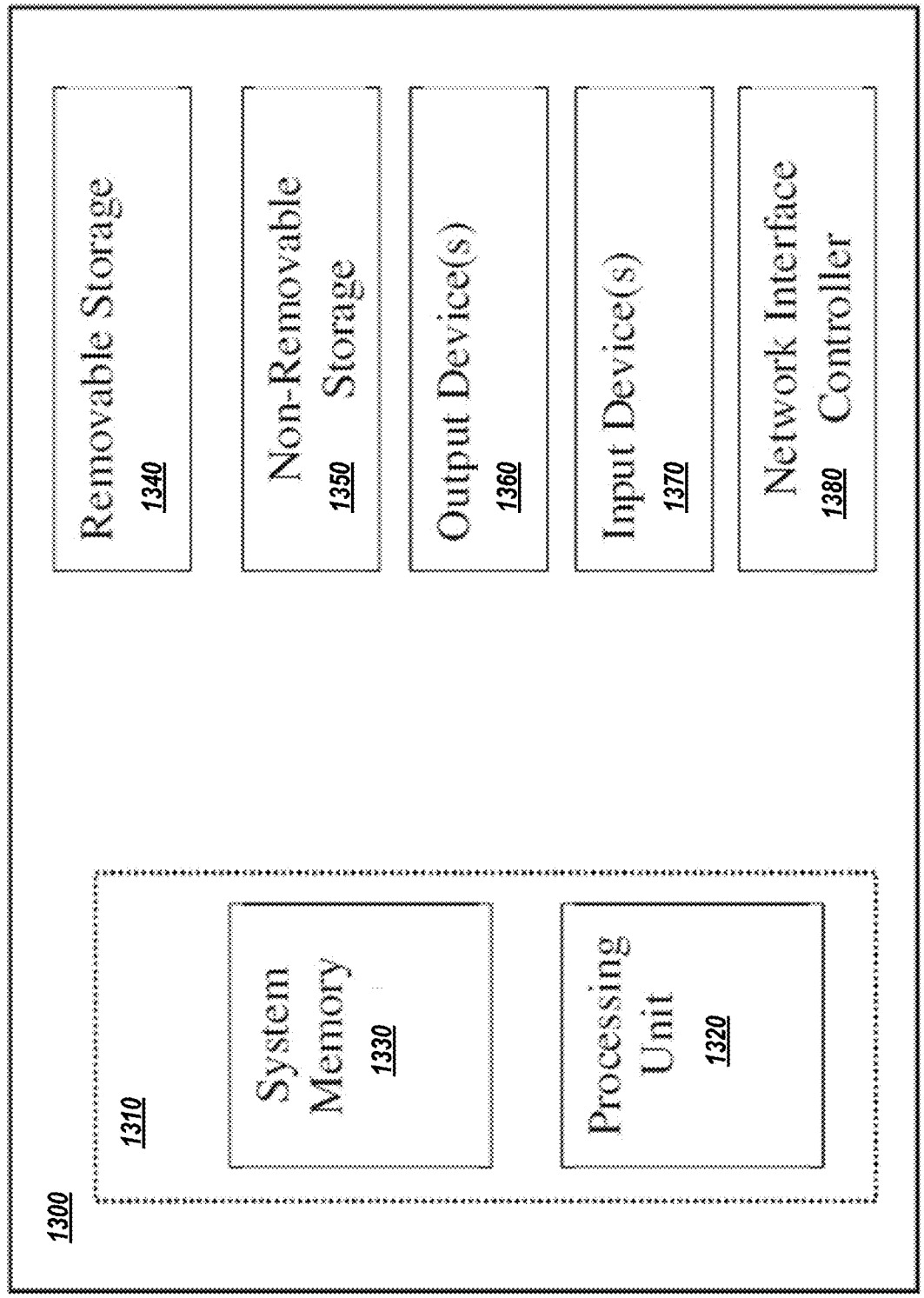
FIG. 13 depicts examples of hardware components for generating a VNN, according to some aspects.

Referring to FIG. 13, an example computing device 1300 upon which embodiments of the exemplary VNN may be implemented is illustrated. It should be understood that the example computing device 1300 is only one example of a suitable computing environment upon which embodiments of the invention may be implemented. Optionally, the computing device 1300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1300 to provide the functionality of a number of servers that is not directly bound to the number of computers in the computing device 1300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 1300 typically includes at least one processing unit 1320 and system memory 1330. Depending on the exact configuration and type of computing device, system memory 1330 may be volatile (such as random-access memory (RAM)), non-volatile (such as read-only memory (ROM), flash memory, etc.), or some combination of the two. This most basic configuration is illustrated in FIG. 13 by dashed line 1310. The processing unit 1320 may be a standard programmable processor that performs arithmetic and logic operations necessary for operation of the computing device 1300. While only one processing unit 1320 is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application specific circuits (ASICs). Thus, while instructions may be discussed as executed by a processor, the instructions may be executed simultaneously, serially, or otherwise executed by one or multiple processors. The computing device 1300 may also include a bus or other communication mechanism for communicating information among various components of the computing device 1300.

Computing device 1300 may have additional features/functionality. For example, computing device 1300 may include additional storage such as removable storage 1340 and non-removable storage 1350 including, but not limited to, magnetic or optical disks or tapes. Computing device 1300 may also contain network connection(s) 1380 that allow the device to communicate with other devices such as over the communication pathways described herein. The network connection(s) 1380 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1300 may also have input device(s) 1370 such as keyboards, keypads, switches, dials, mice, track balls, touch screens, voice recognizers, card readers, paper tape readers, or other well-known input devices. Output device(s) 1360 such as printers, video monitors, liquid crystal displays (LCDs), touch screen displays, displays, speakers, etc. may also be included. The additional devices may be connected to the bus in order to facilitate communication of data among the components of the computing device 1300. All these devices are well known in the art and need not be discussed at length here.

The processing unit 1320 may be configured to execute program code encoded in tangible, computer-readable media. Tangible, computer-readable media refers to any media that is capable of providing data that causes the computing device 1300 (i.e., a machine) to operate in a particular fashion. Various computer-readable media may be utilized to provide instructions to the processing unit 1320 for execution. Example tangible, computer-readable media may include, but is not limited to, volatile media, non-volatile media, removable media and non-removable media implemented in any method or technology for storage of information such as computer readable instructions, data structures, program modules or other data. System memory 1330, removable storage 1340, and non-removable storage 1350 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1320 may execute program code stored in the system memory 1330. For example, the bus may carry data to the system memory 1330, from which the processing unit 1320 receives and executes instructions. The data received by the system memory 1330 may optionally be stored on the removable storage 1340 or the non-removable storage 1350 before or after execution by the processing unit 1320.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Use of the phrase "and/or" indicates that anyone or any combination of a list of options can be used. For example, "A, B, and/or C" means "A", or "B", or "C", or "A and B", or "A and C", or "B and C", or "A and B and C". As used in the specification, the singular forms "a," "an" and "the" include plural referents unless the context clearly dictates otherwise. Moreover, titles or subtitles may be used in this specification for the convenience of a reader, which shall have no influence on the scope of the disclosed technology. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Moreover, it should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user or machine/system/computer/processor. Moreover, the various components may be in communication via wireless and/or hardwire or other desirable and available communication means, systems and hardware. Moreover, various components and modules may be substituted with other modules or components that provide similar functions.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence of such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

The following patents, applications and publications as listed below and throughout this document are hereby incorporated by reference in their entirety herein.

List of References

[1] Abadi, M.; Barham, P.; Chen, J.; Chen, Z.; Davis, A.; Dean, J.; Devin, M.; Ghemawat, S.; Irving, G.; Isard, M.; et al. 2016. Tensorflow: A system for large-scale machine learning. In 12th fUSENIXg Symposium on Operating Systems Design and Implementation (fOSDIg 16), 265-283.

[2] Baccouche, M.; Mamalet, F.; Wolf, C.; Garcia, C.; and Baskurt, A. 2011. Sequential deep learning for human action recognition. In International workshop on human behavior understanding, 29-39. Springer.

[3] Carreira, J., and Zisserman, A. 2017. Quo vadis, action recognition? a new model and the kinetics dataset. In proceedings of the IEEE Conference on Computer Vision and Pattern Recognition, 6299-6308.

[4] Dalal, N., and Triggs, B. 2005. Histograms of oriented gradients for human detection.

[5] Deng, J.; Dong, W.; Socher, R.; L, L.-J.; Li, K.; and Fei-Fei, L. 2009. Imagenet: A large-scale hierarchical image database. In 2009 IEEE conference on computer vision and pattern recognition, 248-255.

[6] Diba, A.; Sharma, V.; and Van Gool, L. 2017. Deep temporal linear encoding networks. In Proceedings of the IEEE conference on Computer Vision and Pattern Recognition, 2329-2338.

[7] Farabet, C.; Couprie, C.; Najman, L.; and LeCun, Y. 2012. Learning hierarchical features for scene labeling. IEEE transactions on pattern analysis and machine intelligence 35(8):1915-1929.

[8] Feichtenhofer, C.; Pinz, A.; and Zisserman, A. 2016. Convolutional two-stream network fusion for video action recognition. In Proceedings of the IEEE conference on computer vision and pattern recognition, 1933-1941.

[9] Gao, Y.; Beijbom, O.; Zhang, N.; and Darrell, T. 2016. Compact bilinear pooling. In Proceedings of the IEEE conference on computer vision and pattern recognition, 317-326.

[10] Goodfellow, I.; Pouget-Abadie, J.; Mirza, M.; Xu, B.; Warde-Farley, D.; Ozair, S.; Courville, A.; and Bengio, Y. 2014. Generative adversarial nets. In Advances in neural information processing systems, 2672-2680.

[11] Hoffman, J.; Gupta, S.; and Darrell, T. 2016. Learning with side information through modality hallucination. In Proceedings of the IEEE Conference on Computer Vision and Pattern Recognition, 826-834.

[12] Isola, P.; Zhu, J.-Y.; Zhou, T.; and Efros, A. A. 2017. Image-to-image translation with conditional adversarial networks. In Proceedings of the IEEE conference on computer vision and pattern recognition, 1125-1134.

[13] Ji, S.; Xu, W.; Yang, M.; and Yu, K. 2012. 3d convolutional neural networks for human action recognition. IEEE transactions on pattern analysis and machine intelligence 35(1):221-231.

[14] Karpathy, A.; Toderici, G.; Shetty, S.; Leung, T.; Sukthankar, R.; and Fei-Fei, L. 2014. Large-scale video classification with convolutional neural networks. In Proceedings of the IEEE conference on Computer Vision and Pattern Recognition, 1725-1732.

[15] Kay, W.; Carreira, J.; Simonyan, K.; Zhang, B.; Hillier, C.; Vijayanarasimhan, S.; Viola, F.; Green, T.; Back, T.; Natsev, P.; et al. 2017. The kinetics human action video dataset. arXiv preprint arXiv:1705.06950.

[16] Kong, Y., and Fu, Y. 2018. Human action recognition and prediction: A survey. arXiv preprint arXiv: 1806.11230.

[17] Krizhevsky, A.; Sutskever, I.; and Hinton, G. E. 2012. Imagenet classification with deep convolutional neural networks. In Advances in neural information processing systems, 1097-1105.

[18] Kuehne, H.; Jhuang, H.; Garrote, E.; Poggio, T.; and Serre, T. 2011. Hmdb: a large video database for human motion recognition. In 2011 International Conference on Computer Vision, 2556-2563. IEEE.

[19] Kumar, R.; Banerjee, A.; Vemuri, B. C.; and Pfister, H. 2011. Trainable convolution filters and their application to face recognition. IEEE transactions on pattern analysis and machine intelligence 34(7):1423-1436.

[20] LeCun, Y.; Bottou, L.; Bengio, Y.; Haffner, P.; et al. 1998. Gradient-based learning applied to document recognition. Proceedings of the IEEE 86(11):2278-2324.

[21] Lin, T.-Y.; RoyChowdhury, A.; and Maji, S. 2015. Bilinear CNNs for fine-grained visual recognition. arXiv preprint arXiv:1504.07889.

[22] Liu, J.; Luo, J.; and Shah, M. 2009. Recognizing realistic actions from videos in the wild. Citeseer.

[23] Niebles, J. C.; Chen, C.-W.; and Fei-Fei, L. 2010. Modeling temporal structure of decomposable motion segments for activity classification. In European conference on computer vision, 392-405. Springer.

[24] Osowski, S., and Quang, T. V. 1994. Multilayer neural network structure as volterra filter. In Proceedings of IEEE International Symposium on Circuits and Systems-ISCAS '94, volume 6, 253-256. IEEE.

[25] Roheda, S.; Krim, H.; Luo, Z.-Q.; and Wu, T. 2018a. Decision level fusion: An event driven approach. In 201826th European Signal Processing Conference (EUSIPCO), 2598-2602. IEEE.

[26] Roheda, S.; Riggan, B. S.; Krim, H.; and Dai, L. 2018b. Cross-modality distillation: A case for conditional generative adversarial networks. In 2018 IEEE International Conference on Acoustics, Speech and Signal Processing (ICASSP), 2926-2930. IEEE.

[27] Roheda, S.; Krim, H.; Luo, Z.-Q.; and Wu, T. 2019. Event driven fusion. arXiv preprint arXiv:1904.11520.

[28] Schetzen, M. 1980. The volterra and wiener theories of nonlinear systems.

[29] Sermanet, P.; Eigen, D.; Zhang, X.; Mathieu, M.; Fergus, R.; and LeCun, Y. 2013. Overfeat: Integrated recognition, localization and detection using convolutional networks. arXiv preprint arXiv:1312.6229.

[30] Simonyan, K., and Zisserman, A. 2014. Two-stream convolutional networks for action recognition in videos. In Advances in neural information processing systems, 568-576.

[31] Sivic, J., and Zisserman, A. 2003. Video google: A text retrieval approach to object matching in videos. In null, 1470. IEEE.

[32] Soomro, K.; Zamir, A. R.; and Shah, M. 2012. Ucf101: A dataset of 101 human actions classes from videos in the wild. arXiv preprint arXiv:1212.0402.

[33] Tran, D.; Bourdev, L.; Fergus, R.; Torresani, L.; and Paluri, M. 2015. Learning spatiotemporal features with 3d convolutional networks. In Proceedings of the IEEE international conference on computer vision, 4489-4497.

[34] Volterra, V. 2005. Theory of functionals and of integral and integro-differential equations. Courier Corporation.

[35] Wang, H.; Ullah, M. M.; Klaser, A.; Laptev, I.; and Schmid, C. 2009. Evaluation of local spatio-temporal features for action recognition.

[36] Yi, S.; Krim, H.; and Norris, L. K. 2011. Human activity modeling as brownian motion on shape manifold. In International Conference on Scale Space and Variational Methods in Computer Vision, 628-639. Springer.

[37] Zach, C.; Pock, T.; and Bischof, H. 2007. A duality based approach for realtime tv-11 optical flow. In Joint pattern recognition symposium, 214-223. Springer.

[38] Zoumpourlis, G.; Doumanoglou, A.; Vretos, N.; and Daras, P. 2017. Non-linear convolution filters for cnn-based learning. In Proceedings of the IEEE International Conference on Computer Vision, 4761-4769.

[39] Gulrajani, I.; Ahmed, F.; Arjovsky, M.; Dumoulin, V.; and Courville, A. C. 2017. Improved training of Wasserstein gans. In Advances in neural information processing systems, 5767-5777.

[40] Mandizadehaghdam, S.; Panahi, A.; and Krim, H. 2019.

[41] Sparse generative adversarial network. In Proceedings of the IEEE International Conference on Computer Vision Workshops, 0-0.

[42] Rudin, W., et al. 1964. Principles of mathematical analysis, volume 3. McGraw-hill New York.

[43] Stone, M. H. 1948. The generalized weierstrass approximation theorem. Mathematics Magazine 21(5): 237-254.

Second List of References

[1'] V. Volterra, "Theory of functionals and of integral and integrodifferential equations," 1959.

[2'] S. Roheda and H. Krim, "Conquering the cnn overparameterization dilemma: A volterra filtering approach for action recognition," in Proceedings of the AAAI Conference on Artificial Intelligence, vol. 34, no. 07, 2020, pp. 11948-11956.

[3'] G. Zoumpourlis, A. Doumanoglou, N. Vretos, and P. Daras, "Non-linear convolution filters for cnn-based learning," in Proceedings of the IEEE International Conference on Computer Vision, 2017, pp. 4761-4769.

[4'] R. Kumar, A. Banerjee, B. C. Vemuri, and H. Pfister, "Trainable convolution filters and their application to face recognition," IEEE transactions on pattern analysis and machine intelligence, vol. 34, no. 7, pp. 1423-1436, 2011.

[5'] O. Hellwich and C. Wiedemann, "Object extraction from high-resolution multisensor image data," in Third International Conference Fusion of Earth Data, Sophia Antipolis, vol. 115, 2000.

[6'] Z. Korona and M. M. Kokar, "Model theory based fusion framework with application to multi-sensor target recognition," in 1996 IEEE/SICE/RSJ International Conference on Multi-sensor Fusion and Integration for Intelligent Systems (Cat. No. 96TH8242). IEEE, 1996, pp. 9-16.

[7'] F. K. Soong and A. E. Rosenberg, "On the use of instantaneous and transitional spectral information in speaker recognition," IEEE Transactions on Acoustics, Speech, and Signal Processing, vol. 36, no. 6, pp. 871-879, 1988.

[8'] L. Xu, A. Krzyzak, and C. Y. Suen, "Methods of combining multiple classifiers and their applications to handwriting recognition," IEEE transactions on systems, man, and cybernetics, vol. 22, no. 3, pp. 418-435, 1992.

[9'] J. Ngiam, A. Khosla, M. Kim, J. Nam, H. Lee, and A. Ng, "Multimodal deep learning (pp. 689-696)," in International conference on machine learning (ICML), Bellevue, Wash., 2011.

[10'] D. Ramachandram and G. W. Taylor, "Deep multimodal learning: A survey on recent advances and trends," IEEE Signal Processing Magazine, vol. 34, no. 6, pp. 96-108, 2017.

[11'] A. Valada, G. L. Oliveira, T. Brox, and W. Burgard, "Deep multispectral semantic scene understanding of forested environments using multimodal fusion," in International Symposium on Experimental Robotics. Springer, 2016, pp. 465-477.

[12'] S. Roheda, B. S. Riggan, H. Krim, and L. Dai, "Cross-modality distillation: A case for conditional generative adversarial networks," in 2018 IEEE International Conference on Acoustics, Speech and Signal Processing (ICASSP). IEEE, 2018, pp. 2926-2930.

[13'] S. Roheda, H. Krim, Z.-Q. Luo, and T. Wu, "Decision level fusion: An event driven approach," in 2018 26th European Signal Processing Conference (EUSIPCO). IEEE, 2018, pp. 2598-2602.

[14'] E. Elhamifar and R. Vidal, "Sparse subspace clustering: Algorithm, theory, and applications," IEEE transactions on pattern analysis and machine intelligence, vol. 35, no. 11, pp. 2765-2781, 2013.

[15'] X. Bian and H. Krim, "Bi-sparsity pursuit for robust subspace recovery," in 2015 IEEE International Conference on Image Processing (ICIP). IEEE, 2015, pp. 3535-3539.

[16'] M. Abavisani and V. M. Patel, "Deep multimodal subspace clustering networks," IEEE Journal of Selected Topics in Signal Processing, vol. 12, no. 6, pp. 1601-1614, 2018.

[17'] D. P. Kingma and J. Ba, "Adam: A method for stochastic optimization," arXiv preprint arXiv:1412.6980, 2014.

[18'] A. Y. Ng, M. I. Jordan, and Y. Weiss, "On spectral clustering: Analysis and an algorithm," in Advances in neural information processing systems, 2002, pp. 849-856.

[19'] K.-C. Lee, J. Ho, and D. J. Kriegman, "Acquiring linear subspaces for face recognition under variable lighting," IEEE Transactions on pattern analysis and machine intelligence, vol. 27, no. 5, pp. 684-698, 2005.

[20'] G. Liu, Z. Lin, S. Yan, J. Sun, Y. Yu, and Y. Ma, "Robust recovery of subspace structures by low-rank representation," IEEE transactions on pattern analysis and machine intelligence, vol. 35, no. 1, pp. 171-184, 2012.

[21'] S. Hu, N. J. Short, B. S. Riggan, C. Gordon, K. P. Gurton, M. Thielke, P. Gurram, and A. L. Chan, "A polarimetric thermal database for face recognition research," in Proceedings of the IEEE conference on computer vision and pattern recognition workshops, 2016, pp. 187-194.

[22'] S. Ghanem, A. Panahi, H. Krim, and R. A. Kerekes "Robust Group Subspace Recovery: A New Approach for Multi-Modality Data Fusion" in IEEE Sensors Journal 2020.

[23'] S. Ghanem, A. Panahi, H. Krim and R. A. Kerekes "Information subspace-based fusion for vehicle classification." in European Signal Processing Conference (EUSIPCO), IEEE, 2018.

[24'] S. Ghanem, H. Krim and R. A. Kerekes "Information Fusion: Scaling Subspace Driven Approaches" Information Fusion Journal.

What is claimed is:

1. A computer-implemented neural network system comprising a processor and a memory configured to execute a memory structure comprising nodes connected via a plurality of layers, the memory structure comprising:

a plurality of kernels, a set of which being configured to execute an $n^{th}$ order filter, wherein the plurality of kernels of the $n^{th}$ order filters are repeatedly configured in a plurality of cascading layers of interconnected kernels to form a cascading hierarchical structure that approximates a high-order Volterra filter, wherein the plurality of cascading layers include at least a first cascade layer and a second cascade layer, wherein the output features of the first cascade layer are overlapped to provide non-linearly cascading inputs into the second cascade layer.

2. The computer-implemented neural network system of claim 1, wherein the $n^{th}$ order filters each comprise a $2^{nd}$ or $3^{rd}$-order filter to form the cascading hierarchical structure and approximates a $4^{th}$ order filter or more.

3. The computer-implemented neural network system of claim 1, wherein the $n^{th}$ order filters each includes a Volterra filter that models an input-output relationship of a nonlinear system.

4. The computer-implemented neural network system of claim 3, wherein the Volterra filter is implemented as a product operator of two 3-dimensional matrices.

5. The computer-implemented neural network system of claim 1, wherein the cascading hierarchical structure approximates a $K^{th}$ order filter from Z number of $2^{nd}$ order filters according to $K=2^{2^{(Z-1)}}$.

6. The computer-implemented neural network system of claim 1, wherein the output features of the first cascade layer are overlapped to provide quadratic interactions between the first cascading layer and the second cascading layer.

7. The computer-implemented neural network system of claim 1, wherein the set of the plurality of kernels each comprises a Volterra filter having an $n^{th}$ order filter and a filter length of at least 2.

8. The computer-implemented neural network system of claim 1, wherein each cascading layer of the plurality of cascading layers has a same configuration.

9. The computer-implemented neural network system of claim 1, wherein each kernel of a first cascade layer has a first configuration and each kernel of a second cascade layer has a second configuration, wherein the first configuration is different from the second configuration.

10. The computer-implemented neural network system of claim 1, wherein the computer-implemented neural network is configured to output a plurality of predictor values each associated with a likelihood of a given recognized action being present or not present from among a set of evaluateable recognized actions.

11. The computer-implemented neural network system of claim 1, wherein the plurality of kernels of the cascading hierarchical structure are used to independently assess a first data set for first modality features, wherein the memory structure further comprises:

a second plurality of kernels, a set of which being configured to execute an $m^{th}$ order Volterra filter, wherein the second plurality of kernels of the $m^{th}$ order filters are repeatedly configured in a plurality of cascading layer of interconnected kernels to form a second cascading hierarchical structure that approximates a high-order filter substantially greater than m, wherein the second plurality of kernels of the second cascading hierarchical structure are used to independently assess a second data set for second modality features, a fusion operator configured to fuse i) the first modality features of the first plurality of kernels in the first cascading hierarchical structure and ii) the second modality features of the second plurality of kernels in the second cascading hierarchical structure to generate output predictors.

12. The computer-implemented neural network system of claim 11, wherein the fusion operator comprises a Volterra filter.

13. The computer-implemented neural network system of claim 11, wherein the first and second modality features comprise spatial features and temporal features, respectively, wherein the computer-implemented neural network further comprises a classifier to output indication of presence or non-presence of a recognized action in a set of video frames or an image sequence having representations of one or more action therein based on the spatial features and temporal features.

14. The computer-implemented neural network system of claim 13, wherein the set of video frames comprises red, green, and blue (RGB) data values.

15. The computer-implemented neural network system of claim 11, wherein the first data set comprise a set of video frames.

16. The computer-implemented neural network system of claim 11, wherein the second modality features are associated with an optical flow analysis.

17. The computer-implemented neural network system of claim 11, wherein the fusion operator evaluate non-linear interactions between the first modality features and the second modality features.

18. The computer-implemented neural network system of claim 1, wherein the plurality of kernels and cascading hierarchical structure are configured as a neural network auto-encoder.

19. The computer-implemented neural network system of claim 1, wherein the plurality of kernels and cascading hierarchical structure are configured as a generative adversarial network.

20. The computer-implemented neural network system of claim 1, wherein the output features of the first cascade layer additionally includes non-overlapping features to provide cascading inputs into the second cascade layer.

21. A method comprising:
training, via a computing system, a Volterra neural network comprising plurality of kernels each configured to execute an $n^{th}$ order filter, wherein the plurality of kernels of the $n^{th}$ order filters are repeatedly configured in a plurality of cascading layers of interconnected kernels to form a cascading hierarchical structure that approximates a high-order filter substantially greater than n, wherein the plurality of cascading layers include at least a first cascade layer and a second cascade layer, wherein the output features of the first cascade layer are overlapped to provide non-linearly cascading inputs into the second cascade layer; and
using the trained neural network in a video or image processing application.

22. A non-transitory computer readable medium comprising instructions, wherein execution of the instructions, by a processor, cause the processor to:
train a Volterra neural network comprising plurality of kernels each configured to execute an $n^{th}$ order filter, wherein the plurality of kernels of the $n^{th}$ order filters are repeatedly configured in a plurality of cascading layers of interconnected kernels to form a cascading hierarchical structure that approximates a high-order filter substantially greater than n, wherein the plurality of cascading layers include at least a first cascade layer and a second cascade layer, wherein the output features of the first cascade layer are overlapped to provide non-linearly cascading inputs into the second cascade layer; and
use the trained neural network in a video or image processing application.

* * * * *